US011873377B2

(12) United States Patent
Hart et al.

(10) Patent No.: US 11,873,377 B2
(45) Date of Patent: *Jan. 16, 2024

(54) BLOWN FILMS COMPRISING BIMODAL ETHYLENE-BASED POLYMERS HAVING HIGH MOLECULAR WEIGHT HIGH DENSITY FRACTIONS

(71) Applicant: Dow Global Technologies LLC, Midland, MI (US)

(72) Inventors: Kyle E. Hart, Manvel, TX (US); Mehmet Demirors, Pearland, TX (US); Timothy W. Gambrel, Lake Jackson, TX (US); Philip P. Fontaine, Pearland, TX (US); Vivek Kalihari, Missouri City, TX (US); Francis O. Olajide, Jr., Pearland, TX (US); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 397 days.

This patent is subject to a terminal disclaimer.

(21) Appl. No.: 16/973,649

(22) PCT Filed: Jun. 13, 2019

(86) PCT No.: PCT/US2019/036975
§ 371 (c)(1),
(2) Date: Dec. 9, 2020

(87) PCT Pub. No.: WO2019/241518
PCT Pub. Date: Dec. 19, 2019

(65) Prior Publication Data
US 2021/0246274 A1 Aug. 12, 2021

Related U.S. Application Data

(60) Provisional application No. 62/685,540, filed on Jun. 15, 2018.

(51) Int. Cl.
*C08F 210/16* (2006.01)
*C08L 23/08* (2006.01)
*C08J 5/18* (2006.01)
*C08F 2/00* (2006.01)

(52) U.S. Cl.
CPC .............. *C08J 5/18* (2013.01); *C08F 210/16* (2013.01); *C08L 23/0815* (2013.01); *C08F 2/001* (2013.01); *C08F 2500/05* (2013.01); *C08F 2500/10* (2013.01); *C08F 2500/12* (2013.01); *C08J 2323/06* (2013.01); *C08J 2323/12* (2013.01); *C08L 2203/16* (2013.01)

(58) Field of Classification Search
CPC .............. C08F 210/16; C08F 2500/05; C08F 2500/10; C08F 2500/12; C08F 2/001; C08L 23/0815; C08L 2203/16
See application file for complete search history.

(56) References Cited

U.S. PATENT DOCUMENTS

| 3,338,992 A | 8/1967 | Allison |
| 3,502,538 A | 3/1970 | Petersen |
| 3,502,763 A | 3/1970 | Hartmann |
| 3,645,992 A | 2/1972 | Elston |
| 3,849,241 A | 11/1974 | Butin et al. |
| 3,914,342 A | 10/1975 | Mitchell |
| 4,041,203 A | 8/1977 | Brock et al. |
| 4,076,698 A | 2/1978 | Anderson et al. |
| 4,314,912 A | 2/1982 | Lowery et al. |
| 4,340,563 A | 7/1982 | Appel et al. |
| 4,374,888 A | 2/1983 | Bornslaeger |
| 4,547,475 A | 10/1985 | Glass et al. |
| 4,599,392 A | 7/1986 | McKinney et al. |
| 4,612,300 A | 9/1986 | Coleman |
| 5,169,706 A | 12/1992 | Collier et al. |
| 5,272,236 A | 12/1993 | Lai et al. |
| 5,278,272 A | 1/1994 | Lai et al. |
| 5,292,845 A | 3/1994 | Kawasaki et al. |
| 5,582,923 A | 12/1996 | Kale et al. |
| 5,844,045 A | 12/1998 | Kolthammer et al. |
| 5,869,575 A | 2/1999 | Kolthammer et al. |
| 5,977,251 A | 11/1999 | Kao et al. |
| 6,176,952 B1 | 1/2001 | Maugans et al. |
| 6,448,341 B1 | 9/2002 | Kolthammer et al. |

(Continued)

FOREIGN PATENT DOCUMENTS

| CN | 102257019 A | 11/2011 |
| EP | 1041090 A1 | 10/2000 |

(Continued)

OTHER PUBLICATIONS

Williams et al., "The Construction of a Polyethylene Calibration Curve for Gel Permeation Chromatography Using Polystyrene Fractions", J. Poly. Sci., Poly. Let., 1968, 621-624.
Monraball et al., "Crystallization Elution Fractionations. A New Separation Process for Polyolefin Resins", Macromolecular Symposia, 2007, 71-79.
Karjala et al., "Detection of Low Levels of Long-chain Branching in Polyolefins", Annual Technical Conference, Society of Plastics Engineers, 2008, 887-891.
International Search Report and Written Opinion pertaining to PCT/US2019/036903, dated Oct. 4, 2019.
International Search Report and Written Opinion pertaining to PCT/US2019/036966, dated Oct. 24, 2019.

(Continued)

*Primary Examiner* — Rip A Lee
(74) *Attorney, Agent, or Firm* — Dinsmore & Shohl LLP

(57) ABSTRACT

A blown film having a bimodal ethylene-based polymer including a high density fraction (HDF) from 3.0% to 25.0%, an $I_{10}/I_2$ ratio from 5.5 to 7.5, a short chain branching distribution (SCBD) less than or equal to 10 C, a zero shear viscosity ratio from 1.0 to 2.5, a density from 0.902 g/cc to 0.925 g/cc, and a melt index ($I_2$) from 0.5 g/10 mins to 2.0 g/10 mins.

20 Claims, 2 Drawing Sheets

(56) References Cited

U.S. PATENT DOCUMENTS

| | | | |
|---|---|---|---|
| 6,469,103 B1 * | 10/2002 | Jain | C08L 23/0815 |
| | | | 525/240 |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,812,286 B2 | 11/2004 | Schardl et al. | |
| 6,869,904 B2 | 3/2005 | Boussie et al. | |
| 7,030,256 B2 | 4/2006 | Boussie et al. | |
| 7,230,511 B2 | 6/2007 | Onishi et al. | |
| 7,829,641 B2 | 11/2010 | Etherton et al. | |
| 8,058,373 B2 | 11/2011 | Stevens et al. | |
| 8,101,696 B2 | 1/2012 | Konze et al. | |
| 8,829,115 B2 | 9/2014 | Hermel-Davidock et al. | |
| 9,029,487 B2 | 5/2015 | Klosin et al. | |
| 9,115,275 B2 | 8/2015 | Kupar et al. | |
| 9,834,712 B2 * | 12/2017 | Kapur | B32B 27/36 |
| 2003/0130464 A1 | 7/2003 | Ho et al. | |
| 2004/0158011 A1 | 8/2004 | Jain et al. | |
| 2005/0043460 A1 | 2/2005 | McCormack et al. | |
| 2008/0287634 A1 | 11/2008 | Nieto et al. | |
| 2012/0238720 A1 | 9/2012 | Lam et al. | |
| 2012/0277380 A1 | 11/2012 | Karjala et al. | |
| 2013/0046061 A1 | 2/2013 | Hermel-Davidock et al. | |
| 2015/0259586 A1 | 9/2015 | Kapur et al. | |
| 2017/0081444 A1 | 3/2017 | Wang et al. | |
| 2017/0247485 A1 | 8/2017 | Morrison et al. | |
| 2021/0246288 A1 * | 8/2021 | Hart | C08F 2/01 |

FOREIGN PATENT DOCUMENTS

| | | |
|---|---|---|
| EP | 1656254 A1 | 5/2006 |
| EP | 3214115 A1 | 9/2017 |
| EP | 3285706 A1 | 2/2018 |
| EP | 3312007 A1 | 4/2018 |
| JP | 2009517497 A | 4/2009 |
| TW | 201321185 A | 6/2013 |
| WO | 9308221 A2 | 4/1993 |
| WO | 2005021262 A1 | 3/2005 |
| WO | 2008095807 A1 | 8/2008 |
| WO | 2014058639 A1 | 4/2014 |
| WO | 2016109264 A1 | 7/2016 |
| WO | 2017152065 A1 | 9/2017 |

OTHER PUBLICATIONS

International Search Report and Written Opinion pertaining to PCT/US2019/036969, dated Sep. 11, 2019.
International Search Report and Written Opinion pertaining to PCT/US2019/036975, dated Sep. 11, 2019.
International Search Report and Written Opinion pertaining to PCT/US2019/062750, dated Feb. 19, 2020.
Randall, J.C., "A Review of High Resolution Liquid Carbon Nuclear Magnetic Resonance Characterizations of Ethylene-Based Polymers", Rev. Macromol. Chem. Phys., 201-317 .
Chinese Search Report dated Sep. 1, 2022 pertaining to Chinese patent application No. 201980044940.1 2 pages.
Chinese Office Action dated Sep. 1, 2022 pertaining to Chinese patent application No. 201980044940.1 2 pages.
Communication pursuant to Rules 161(1) and 162 EPC, pertaining to Patent Application No. 19739449.7, dated Jan. 22, 2021.
Ex Parte Quayle dated Mar. 27, 2023, pertaining to U.S. Appl. No. 16/973,626, 8 pgs.
Chinese Office Action dated Jan. 20, 2023, pertaining to CN Patent Application No. 201980039875.3, 15 pgs.
Non-Final Office Action pertaining to U.S. Appl. No. 16/973,639, dated Feb. 7, 2023, 9 pages.
JP Office Action dated Aug. 25, 2023, pertaining to JP Application No. 2020569798, 8 pgs.

* cited by examiner

BLOWN FILMS COMPRISING BIMODAL ETHYLENE-BASED POLYMERS HAVING HIGH MOLECULAR WEIGHT HIGH DENSITY FRACTIONS

CROSS-REFERENCE TO RELATED APPLICATIONS

This application is a National Stage Entry under 35 U.S.C. § 371 of International Patent Application No. PCT/US2019/036975, filed Jun. 13, 2019, which claims priority to U.S. Provisional Application, 62/685,540, filed Jun. 15, 2018, both of which are incorporated herein by reference in their entireties.

TECHNICAL FIELD

Embodiments of the present disclosure generally relate blown films comprising bimodal ethylene-based polymers having high density fractions, and particularly relate to blown films comprising bimodal ethylene-based polymers having high density fractions and having improved abuse and visual properties.

BACKGROUND

The use of polymeric materials such as ethylene-based polymers in blown film processes is well-known. The extrusion-blown film process is a well know process for preparation of plastic films. The extrusion-blown film process employs an extruder which heats, melts, and conveys the molten polymer and forces it through an annular die. The molten polymer is drawn from the die and formed into a tube shape morphology and eventually passed through a pair of draw or nip rollers. Internal compressed air is then introduced from the mandrel causing the tube to increase in diameter thereby forming a bubble of a desired size. External air is also introduced around the bubble circumference to cool the melt as it exits the die. Film width is typically varied by introducing more or less internal air into the bubble thus increasing or decreasing the bubble size. Film thickness is typically controlled by increasing or decreasing the speed of the draw roll or nip roll to control the draw-down rate. The bubble is then collapsed into two doubled layers of film immediately after passing through the draw or nip rolls. The cooled film can then be processed further by cutting or sealing to produce a variety of consumer products.

SUMMARY

Film properties of blown polymer films may be influenced by the molecular structure of the polymer. Improved film properties such as improved optical properties (e.g., as evidenced by haze, gloss, and clarity tests), improved abuse properties (e.g., as evidenced by dart, puncture, and tear testing), and improved mechanical properties (e.g., as evidenced by tensile and modulus testing) are clearly desirable for a variety of applications. Different polymers have been proposed to achieve such improved properties.

Therefore, as competition increases in the plastic film industry, producers of ethylene-based polymers strive to make their products with broader ranges of properties that can be used to form films with a combination of improved optical properties, abuse properties, and mechanical properties. As such, ongoing needs exist for ethylene-based polymers having a wider array of properties, such as, for example, high molecular weight high density fractions. It has been found that h controlling the location of the catalyst inlet, such that it is upstream from a first reactor and downstream from a second reactor, reactions of components in the presence of the catalyst can better be controlled. Further, because the catalyst is being combined with the components in a flow restricted area, compared to a bulk of a reactor, the catalyst and the components sufficiently mix before they reach the second reactor, and the second reactor can be non-agitated reactor, which reduces costs and energy consumption. Ethylene-based polymers produce by such methods have high molecular weight high density fractions that can be used in plastic films either alone or in combination with other polyethylene films, to provide films with improved optical properties, abuse properties, and mechanical properties.

The present disclosure provides blown films that comprise bimodal ethylene-based polymers having high density fractions and processes and methods for making such bimodal ethylene-based polymers.

Embodiments of the present disclosure are directed to a blown film comprising a bimodal ethylene-based polymer comprising: a high density fraction (HDF) from 3.0% to 25.0%, wherein the high density fraction is measured by crystallization elution fractionation (CEF) integration at temperatures from 93° C. to 119° C.; an $I_{10}/I_2$ ratio from 5.5 to 7.5, wherein $I_2$ is a melt index when measured according to ASTM D 1238 at a load of 2.16 kg and temperature of 190° C. and $I_{10}$ is a melt index when measured according to ASTM D 1238 at a load of 10 kg and temperature of 190° C.; a short chain branching distribution (SCBD) less than or equal to 10° C., Wherein the short chain branching distribution is measured by CEF full width at half height, a density from 0.902 g/cc to 0.925 g/cc, wherein the density is measured in accordance with ASTM D792, Method B, and a melt index ($I_2$) from 0.5 g/10 mins to 2.0 g/10 mins, wherein the melt index ($I_2$) is measured in accordance to ASTM D1238 at 190° C. at 2.16 kg.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
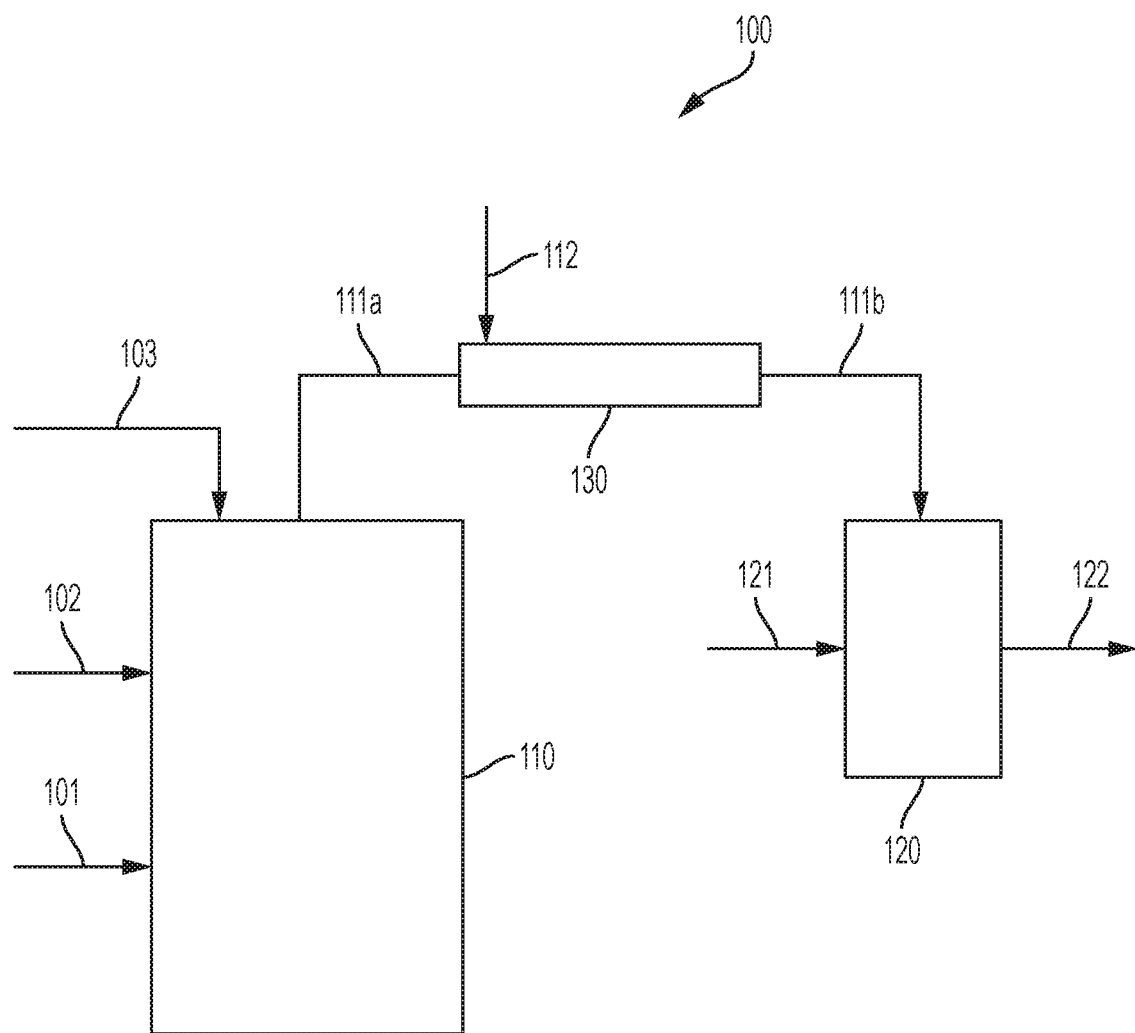
FIG. 1 schematically depicts a system for producing bimodal ethylene-based polymers having high molecular weight high density fractions according to embodiments disclosed and described herein.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

According to one embodiment, a blown film comprising a bimodal ethylene-based polymer comprising: a high density fraction (HDF) from 3.0% to 25.0%, wherein the high density fraction is measured by crystallization elution fractionation (CEF) integration at temperatures from 93° C. to 119° C.; an $I_{10}/I_2$ ratio from 5.5 to 7.5, wherein $I_2$ is a melt index when measured according to ASTM D 1238 at a load of 2.16 kg and temperature of 190° C. and $I_{10}$ is a melt index when measured according to ASTM D 1238 at a load of 10 kg and temperature of 190° C.; a short chain branching distribution (SCBD) less than or equal to 10° C., wherein the short chain branching distribution is measured by CEF full width at half height; a density from 0.902 g/cc to 0.925 g/cc, wherein the density is measured in accordance with ASTM D792, Method B, and a melt index ($I_2$) from 0.5 g/10 mins to 2.0 g/10 mins, wherein the melt index ($I_2$) is measured in accordance to ASTM D1238 at 190° C at 2.16 kg.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

As used herein, "bimodal" means compositions that can be characterized by having at least two (2) polymer subcomponents or "fractions" with varying densities and weight averaged molecular weights, and optionally, may also have different melt index values. In one embodiment, bimodal may be defined by having at least two distinct peaks in a Gel Permeation Chromatography (GPC) chromatogram showing the molecular weight distribution. In another embodiment, bimodal may be defined by having at least two distinct peaks in a Crystallization Elution Fractionation (CEF) chromatogram showing the short chain branching distribution. Bimodal includes resins having two peaks as well as resins having more than two peaks.

As used herein, the "solution polymerization reactor" is a vessel, which performs solution polymerization, wherein ethylene monomer and at least $C_3$-$C_{12}$ α-olefin comonomer copolymerize after being dissolved in a non-reactive solvent that contains a catalyst. In the solution polymerization process, hydrogen may be utilized; however, it is not required in all solution polymerization processes.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of polyethylene known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392; which is hereby incorporated by reference). LDPE resins typically have a density in the range of 0.916 to 0.940 g/cm.

The term "LLDPE", includes resin made using Ziegler-Matta catalyst systems as well as resin made using single-site catalysts, including, but not limited to, bis-metallocene catalysts (sometimes referred to as "m-LLDPE"), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. No. 5,272,236; U.S. Pat. No. 5,278,272; U.S. Pat. No. 5,582,923; and U.S. Pat. No. 5,733,155; the homogeneously branched ethylene polymers such as those in U.S. Pat. No. 3,645,992.; the heterogeneously branched ethylene polymers such as those prepared according to the process disclosed in U.S. Pat. No. 4,076,698; and blends thereof (such as those disclosed in U.S. Pat. No. 3,914,342 or U.S. Pat. No. 5,854,045). The LLDPE resins can be made via gas-phase, solution-phase or slurry polymerization or any combination thereof, using any type of reactor or reactor configuration known in the art. The LLDPE resins can be made via gas-phase, solution-phase, or slurry polymerization or any combination thereof, using any type of reactor or reactor configuration known in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

The term "non-agitated reactor" refers to a reactor that does not include mechanical agitation, such as agitation by a stirrer, a mixer, a kneader, or the like. Examples of non-agitated reactors include plug flow reactors, tank reactors, and loop reactors, all without stirrers, mixers, or the like.

The term "mixer" refers to an apparatus that mechanically mixes the components present in the apparatus. Examples of mixers include static mixers, flow shapers, and vessels comprising a stirrer, mixer, kneader, or the like, in embodiments, components present in the mixer—such as monomers, comonomer, etc.—will react in the mixer.

The term grains per mil (g/mil) is a measure of grain force per thickness of the film measured in mil.

System Configuration

Reference will now be made in detail to systems for producing bimodal ethylene-based polymers having high molecular weight high density fraction according to embodiments disclosed and described herein.

With reference now to the FIG., a system 100 for producing bimodal ethylene-based polymer having a high molecular weight high density fraction according to embodiments comprises a first reactor 110 and a second reactor 120 fluidly connected to the first reactor 110. The type of reactors used for the first reactor 110 and the second reactor 120 are not limited and, in embodiments, are reactors suitable for use as solution polymerization reactors. In embodiments, the first reactor 110 is an agitated solution polymerization reactor, such as, for example a loop reactor, an isothermal reactor, an adiabatic reactor, and a continuous stirred tank reactor in parallel, series, and any combinations thereof. The second reactor 120, according to embodiments, is a non-agitated solution polymerization reactor, such as, for example, a non-agitated tank reactor or a tubular reactor (e.g., a plug flow reactor, a piston flow reactor, etc.).

According to embodiments, one or more mixers 130 are positioned downstream from a first reactor 110 and upstream from a second reactor 120. Although the FIG. only depicts one mixer, it should be understood that additional mixers may be positioned in series or parallel downstream from the first reactor 110 and upstream from the second reactor 120. The mixer 130 may be a flow shaper or static mixer. For example, in some embodiments, mixer 130 may comprise a flow shaper and a static mixer. A "flow shaper" as used herein may be any type of apparatus that alters the flow of a component stream, such as, for example, a tapered pipe, a diffuser, or a nozzle. In embodiments, such as the embodiment depicted in the FIG., the mixer 130 and the non-agitated rector 120 may be separate physical apparatuses. However, in some embodiments, the mixer 130 and the non-agitated reactor 120 may be a single physical apparatus with two distinct zones. As an example, in embodiments, the mixer 130 and non-agitated reactor 120 may both be housed in an elongated tube. In static mixer may be positioned in a first portion of the elongated tube, while a second portion of the elongated tube does not include the static mixer—or any other type of agitator. In such an embodiment, the first zone of the elongated tube where the static mixer is present is the mixer 130 and the second zone of the elongated tube where no agitator is present is the non-agitated reactor 120. In such an embodiment, the mixer 130 and the non-agitated reactor are housed in a single physical apparatus.

As shown in the embodiment depicted in the FIG., the first reactor 110 is configured to receive: feed stream 101 that comprises ethylene monomer and $C_3$-$C_{12}$ α-olefin comonomer in solvent; first catalyst stream 103; and, optionally, hydrogen ($H_2$) stream 102. The components of feed stream 101, first catalyst stream 103, and optional hydrogen stream 102 are reacted in the first reactor 110 to produce a first polymer fraction. This first polymer fraction is outputted from the first reactor 110 as effluent 111a. In embodiments, effluent 111a comprises unreacted ethylene monomer and unreacted $C_3$-$C_{12}$ α-olefin comonomer in addition to the first polymer fraction. It should be understood that, in some embodiments, the components of the feed stream 101 may be added to the first reactor 110 together or as separate streams. For example, ethylene monomer and solvent may be added to the first reactor as a separate stream from the $C_3$-$C_{12}$ α-olefin comonomer. The order at which the ethylene monomer, $C_3$-$C_{12}$ α-olefin comonomer, and solvent into the first reactor 110 is not limited.

With reference still to the FIG., second catalyst stream 112 is added to the effluent 111a downstream of the first reactor 110 (i.e., agitated solution polymerization reactor) and upstream from the second reactor 120 (i.e., non-agitated solution polymerization reactor). The second catalyst stream 112 may, in embodiments be added into the mixer 130. In other embodiments, the second catalyst stream 112 may be added immediately before the mixer 130. Second catalyst stream 112 comprises a different catalyst than the first catalyst stream 103 and facilitates reaction of unreacted ethylene monomer and unreacted $C_3$-$C_{12}$ α-olefin comonomer present in the effluent 111a to produce a second polymer fraction. In embodiments, the second polymer fraction has a density and melt index ($I_2$) that differ from the density and melt index ($I_2$) of the first polymer fraction. The modified effluent 111b, which comprises the first polymer fraction, the second polymer fraction, and second catalyst, is passed from the mixer 130 to the second reactor 120.

A second feed stream 121 comprising additional ethylene monomer, additional $C_3$-$C_{12}$ α-olefin comonomer, and solvent is passed to second reactor 120. The additional ethylene monomer and additional $C_3$-$C_{12}$ α-olefin comonomer from the second feed stream 121 react in the presence of the second catalyst introduced into the second reactor 120 via the modified effluent 111b to form additional second polymer fraction. Accordingly, a bimodal ethylene-based polymer, which comprises first polymer fraction and second polymer fraction is outputted from the second reactor 120 in product stream 122.

By introducing the second catalyst stream 112 downstream from the first reactor 110 and upstream from the second reactor 120, the second catalyst stream 112 mixes with unreacted ethylene monomer and unreacted $C_3$-$C_{12}$ α-olefin comonomer present in effluent 111a prior introduction of second catalyst into the second reactor 120. This circumvents a common issue that occurs when second catalyst is introduced directly into the second reactor 120; gumming of the second catalyst inlet that undesirably restricts the amount of second catalyst that is added to the second reactor 120. Accordingly, by provided the second catalyst stream 112 downstream from the first reactor 110 and upstream from the second reactor 120, agitation is not required in the second reactor 120, which can reduce equipment and operating costs. A mixer 130 mixes the second catalyst stream 112 with unreacted ethylene monomer and unreacted $C_3$-$C_{12}$ α-olefin comonomer present in effluent 111a prior to passing effluent 111a and the second catalyst stream 112 to the second reactor 120. The mixing of unreacted ethylene monomer and unreacted $C_3$-$C_{12}$ α-olefin comonomer in the mixer 130 in the presence of second catalyst allows for reactions of the unreacted ethylene monomer and unreacted $C_3$-$C_{12}$ α-olefin comonomer at low temperatures and high ethylene monomer concentrations, which results in a second polymer fraction with high density, high molecular weight portions to be formed in the mixer 130.

Additionally, in some embodiments, additional ethylene monomer may be added downstream from the first reactor 110 and upstream from the second reactor 120, such as, for example, into the mixer 130, to facilitate formation of the second polymer fraction before modified effluent 111b enters the second reactor 120. In some embodiments, the additional ethylene monomer may be added to effluent 111a (i.e., before the second catalyst stream 112 is introduced into the mixer 130), and in other embodiments, the additional ethylene monomer may be added to the mixer 130.

Methods and Components

Reference will now be made in detail to methods and components used in systems of embodiments disclosed above for producing bimodal ethylene-based polymers having high molecular weight high density fraction according to embodiments disclosed and described herein.

As disclosed previously herein, and with reference to the FIG., the first reactor 110, which is an agitated solution polymerization reactor, receives feed stream 101, first catalyst stream 103, and, optionally, hydrogen stream 102. The components of the feed stream 101—optionally with hydrogen from hydrogen stream 102—react in the presence of a first catalyst, which is introduced into the first reactor 110 via first catalyst stream 103, to form a first polymer fraction. The first polymer fraction and non-reacted components exit the first reactor 110 via effluent 111*a*. Each of these streams and the reaction conditions within the first reactor 110 are described in more detail below.

Feed stream 101 comprises ethylene monomer and $C_3$-$C_{12}$ α-olefin comonomer in solvent. In some embodiments, the comonomer is $C_3$-$C_8$ α-olefin. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, in embodiments, be selected from the group consisting of propylene, 1-butene, 1-hexene, and 1-octene. The solvent present in the feed stream may, in embodiments, be aromatic and paraffin solvents. In some embodiments, the solvent may be isoparaffins, such as, for example, ISOPAR E manufactured by ExxonMobil Chemical.

The hydrogen stream 102 is essentially pure hydrogen and, in embodiments, comprises greater than 97 volume percent (vol. %) hydrogen, such as greater than 98 vol. % hydrogen, or greater than 99 vol. % hydrogen.

The first catalyst is added to the first reactor 110 via first catalyst stream 103 and facilitates reactions between ethylene monomer, $C_3$-$C_{12}$ α-olefin comonomer, and, optionally, hydrogen. Catalysts that may be used in embodiments include, but are not limited to, a post-metallocene catalyst, a constrained geometry complex (CGC) catalyst, a phosphinimine catalyst, or a bis(biphenylphenoxy) catalyst. Details and examples of CGC catalysts are provided in U.S. Pat. Nos. 5,272,236; 5,278,272; 6,812,289; and WO Publication 93/08221, which are all incorporated herein by reference in their entirety. Details and examples of bis(biphenylphenoxy) catalysts are provided in U.S. Pat. Nos. 6,869,904; 7,030,256; 8,101,696; 8,058,373; 9,029,487; which are all incorporated herein by reference in their entirety. In embodiments, the first catalyst may be a molecular catalyst including, but not limited to, bis(biphenylphenoxy) catalysts (also referred to as polyvalent aryloxyether catalysts).

Bis(biphenylphenoxy) catalysts are multi-component catalyst systems comprising a bis(biphenylphenoxy) procatalyst; a cocatalyst that activates the procatalyst, as well as other optional ingredients. In embodiments, the bis(biphenylphenoxy) procatalyst may include a metal-ligand complex according to Formula (I):

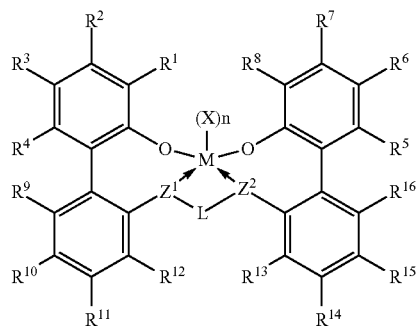

(I)

In Formula (I), M is a metal chosen from titanium, zirconium, or hafnium, the metal being in a formal oxidation state of +2, +3, or +4, n is 0, 1, or 2; when n is 1, X is a monodentate ligand or a bidentate ligand; when n is 2, each X is a monodentate ligand and is the same or different; the metal-ligand complex is overall charge-neutral; O is O (an oxygen atom); each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is ($C_1$-$C_{30}$)hydrocarbyl or ($C_1$-$C_{30}$)heterohydrocarbyl; $R^1$ and $R^8$ are independently selected from the group consisting of ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS$(O)—, $(R^C)_2C=N$—, $R^C(O)O$—, $R^CC(O)$—, $R^C(O)N(R^N)$—, $(R^N)_2NC(O)$—, halogen, and radicals having Formula (II), Formula (III), or Formula (IV):

(II)

(III)

(IV)

In Formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —$Si(R^C)_3$, $Ge(R^C)_3$, —$P(R^P)_2$, —$N(R^N)_2$, —$OR^C$, —$SR^C$, —$NO_2$, —CN, —$CF_3$, $R^CS$ (O)—, $R^CS(O)_2$—, $(R^C)_2C=N$—, $R^CC(O)O$—, $R^COC$ (O)—, $R^CC(O)N(R^N)$—, $(R^N)_2NC(O)$—, halogen, or —H provided at least one of $R^1$ or $R^8$ is a radical having Formula (II), Formula (III), or Formula (IV).

In Formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$—

$OR^C$, $-SR^C$, $-NO_2$, $-CN$, $-CF_3$, $R^CS(O)-$, $R^CS(o)_2-$, $(R^C)_2C=N-$, $R^CC(O)O-$, $R^COC(O)-$, $R^CC(O)N(R^N)-$, $(R^C)_2NC(O)-$, halogen, and $-H$.

Detailed embodiments of various functional groups that can be present in the compositions depicted in Formulae (I)-(IV) will now be described in detail. It should be understood that the following functional groups are exemplary and are disclosed to provide non-limiting examples of the bis(biphenylphenoxy) procatalyst that can be used according to embodiments.

"Independently selected" as used herein indicates that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

When used to describe certain carbon atom-containing chemical groups, a parenthetical expression having the form "$(C_x-C_y)$" or a non-parenthetical expression having the form "$C_x-C_y$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical or "$C_x-C_y$" non-parenthetical may contain more than y carbon atoms depending on the identity of any groups $R^S$. For example, a "$(C_1-C_{40})$alkyl substituted with exactly one group $R^S$, where $R^S$ is phenyl ($-C_6H_5$)" may contain from 7 to 46 carbon atoms. Thus, in general when a chemical group defined using the "$(C_x-C_y)$" parenthetical $C_x-C_y$ non-parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (e.g., X, R, etc.) of the metal-ligand complex of Formula (I) may be unsubstituted having no $R^S$ substituents. In other embodiments, at least one of the chemical groups of the metal-ligand complex of Formula (I) may independently contain one or more than one $R^S$. In some embodiments, the sum total of $R^S$ in the chemical groups of the metal-ligand complex of Formula (I) does not exceed 20. In other embodiments, the sum total of $R^S$ in the chemical groups does not exceed 10. For example, if each $R^{1-5}$ was substituted with two $R^S$, then X and Z cannot be substituted with an $R^S$. In another embodiment, the sum total of $R^S$ in the chemical groups of the metal-ligand complex of Formula (I) may not exceed 5 $R^S$. When two or more than two $R^S$ are bonded to a same chemical group of the metal-ligand complex of Formula (I), each $R^S$ is independently bonded to the same or different carbon atom or heteroatom and may include persubstitution of the chemical group.

"Substitution" as used herein means that at least one hydrogen atom ($-H$) bonded to a carbon atom or heteroatom of a corresponding unsubstituted compound or functional group is replaced by a substituent (e.g., $R^S$). The term "persubstitution" as used herein means that every hydrogen atom (H) bonded to a carbon atom or heteroatom of a corresponding unsubstituted compound or functional group is replaced by a substituent (e.g., $R^S$). The term "polysubstitution" as used herein means that at least two, but fewer than all, hydrogen atoms bonded to carbon atoms or heteroatoms of a corresponding unsubstituted compound or functional group are replaced by a substituent.

As used herein, "$-H$" means a hydrogen or hydrogen radical that is covalently bonded to another atom. "Hydrogen" and "$-H$" are interchangeable, and unless clearly specified mean the same thing.

"$(C_1-C_{40})$hydrocarbyl" as used herein means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

As used in this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$ hydrocarbyl) and other embodiments, a maximum of 12 carbon atoms.

"$(C_1-C_{40})$alkyl" and "$(C_1-C_{18})$alkyl" as used herein mean a saturated straight or branched hydrocarbon radical of from 1 to 40 carbon atoms or from 1 to 18 carbon atoms, respectively, which is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl unsubstituted $(c_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) as used herein means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

"$(C_6-C_{40})$aryl" as used herein means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis [$(C_{20})$alkyl]-phenyl; polyfluorophenyl; pentafluorophenyl; and fluoren-9-one-1-yl.

"$(C_3-C_{10})$cycloalkyl" as used herein means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —CH$_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α, ω-diradical. The α, ω-diradical is a diradical that has maximum carbon backbone spacing between the radical carbons. Some examples of $(C_2-C_{20})$alkylene α, ω-diradicals include ethan-1,2-diyl e., —CH$_2$CH$_2$), propan-1,3-diyl (i.e., —CH$_2$CH$_2$CH$_2$—), 2-methylpropan-1,3-diyl (i.e., —Ch$_2$CH(CH$_3$)CH$_2$—). Some examples of $(C_6-C_{40})$arylene α,ω-diradicals include phenyl-1,4-diyl, napthalen-2,6-diyl, or napthalen-3,7-diyl.

"$(C_1-C_{10})$alkylene" as used herein means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted —CH$_2$CH$_2$—, —(CH$_2$)$_3$—, —(CH$_2$)$_4$—, —CH$_2$)$_5$—, —(CH$_2$)$_6$—, —(CH$_2$)$_7$—, —(CH$_3$)$_8$—, and —(CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{40})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethylbicyclo[2.2.1] heptane, and 2,3-bis(methylene)bicyclo [2.2.2]octene.

"$(C_3-C_{40})$cycloalkylene" as used herein means a cyclic diradical (i.e., the radicals are on ring atoms) of from 3 to 40 carbon atoms that is unsubstituted or substituted by one or more $R^S$.

"Heteroatom" as used herein refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)2, —Ge(R$^C$)$_2$—, or —Si(R$^C$)—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms are replaced with a heteroatom. The term "$(C_1-C_{40})$ heterohydrocarbyl" means a heterohydrocarbon radical of from 1 to 40 carbon atoms, and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{40})$ heterohydrocarbyl and $(C_1-C_{40})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl include $(C_1-C_{40})$heteroalkyl, $(C_1-C_{40})$ hydrocarbyl-O—, $(C_1-C_{40})$hydrocarbyl-S—, $(C_1-C_{40})$hydrocarbyl-S(O)—, $(C_1-C_{40})$ hydrocarbyl-S(O)$_2$—$(C_1-C_{40})$hydrocarbyl-Si(R$^C$)$_2$—, $(C_1-C_{40})$hydrocarbyl-N(R$^N$)—, $(C_1-C_{40})$ hydrocarbyl-P(R$^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1C_{19})$ heteroalkylene, or $(C_1-C_{19})$heteroaryl-$(C_1-C_{20})$ heteroalkylene.

"$(C_1-C_{40})$heteroaryl" as used herein means an unsubstituted or substituted (by one or more $R^S$) mono-, bi- or tricyclic heteroaromatic hydrocarbon radical of from 1 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_1-C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3, 4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{40})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si(R$^C$)$_3$, Ge(R$^C$)$_3$, Si(R$^C$)$_2$, Ge(R$^C$)$_2$, P(R$^P$)$_2$, P(R$^P$), N(R$^N$)$_2$, N(R$^N$), N, O, OR$^C$, S, SR$^C$, S(O), and S(O)$_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted. $(C_2-C_{40})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

"Halogen atom" or "halogen" as used herein mean radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

"Saturated" as used herein means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

Various process control methodologies are contemplated. In one embodiment, Fourier Transform Near-Infrared (FTnIR) Spectrometer may be utilized in a process control feedback loop. For example, in the first solution polymerization reactor, the first and second ethylene-based components will be produced with sufficiently different densities using two catalysts with sufficiently different reactivity ratios. The weight percent of each component can then be precisely monitored in real time through the comonomer concentration measured by the FTnIR Spectrometer at the first reactor exit. Catalyst feed ratio can be adjusted accordingly to reach the target comonomer concentration which is responsible for reaching the target weight percent of each component inside the first reactor. Alternatively, Raman Spectrometer may be utilized in the process control feedback loop, as it provides better comonomer concentration measurement resolution and precision than the Fourier Transform Near-Infrared (FTnIR) Spectrometer.

As noted above, the first catalyst may, in embodiments, comprise a procatalyst—such as, for example, the bis(biphenylphenoxy) procatalyst described above—and one or more cocatalysts that activate the procatalyst. Suitable activating cocatalysts for use according to embodiments include alkyl aluminums; polymeric or oligomeric alumoxanes (also known as aluminoxanes); neutral or strong Lewis acids; and non-polymeric, non-coordinating, ion-forming compounds (including the use of such compounds under oxidizing conditions). Exemplary suitable cocatalysts include, but are not limited to: modified methyl aluminoxane (MMAO), bis(hydrogenated tallow alkyl)methyl tetrakis(pentafluorophenyl)borate(1⁻) amine, triethylaluminum (TEA), and combinations thereof. A suitable activating technique is bulk electrolysis. Combinations of one or more of the foregoing activating cocatalysts and techniques are also contemplated. The term "alkyl aluminum" as used herein means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (cocatalysts) according to embodiments include Group 13 metal compounds containing from 1 to 3 $(C_1-C_{20})$hydrocarbyl substituents as described herein. In embodiments, Group 13 metal compounds are tri($(C_1-C_{20})$hydrocarbyl)-substituted-aluminum or tri($(C_1-C_{20})$hydrocarbyl)-boron compounds. In other embodiments, Group 13 metal compounds are tri(hydrocarbyl)-substituted-aluminum, tri(hydrocarbyl)-boron compounds, tri($(C_1-C_{10})$alkyl)aluminum, tri($(C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating cocatalyst is a tetrakis($(C_1-C_{20})$hydrocarbyl borate (e.g. trityl tetrafluoroborate) or a tri($(C1-C_{20})$hydrocarbyl)ammonium tetra($(C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})$hydrocarbyl$)_4$N⁺ a $((C_1-C_{20})$hydrocarbyl$)_3$N(H)⁺, a $((C_1-C_{20})$hydrocarbyl$)_2$N⁺, $(C_1-C_{20})$hydrocarbylN(H)$_3$⁺, or N(H)$_4$⁺, wherein each $(C_1-C_{20})$hydrocarbyl, when two or more are present, may be the same or different.

Combinations of neutral Lewis acid activators (cocatalysts) as described herein include mixtures comprising a combination of a tri($(C_1-C_4)$alkyl)aluminum and a halogenated tri($(C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris(pentafluoro-phenylborane):(alumoxane)] are from 1:1:1 to 1:10:30, in other embodiments, from 1:1:1.5 to 1:5:10.

In embodiments, a ratio of total number of moles of one or more metal-ligand complexes of Formula (I) to total number of moles of one or more of the activating cocatalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating cocatalyst, in some embodiments the number of moles of the alumoxane that are employed is at least 100 times the number of moles of the metal-ligand complex of Formula (I). When tris(pentafluorophenyl)borane alone is used as the activating cocatalyst, in some other embodiments, the number of moles of the tris(pentafluorophenyl)borane that are employed to the total number of moles of one or more metal-ligand complexes of Formula (I) from 0.5:1 to 10:1, from 1:1 to 6:1, or from 1:1 to 5:1. The remaining activating cocatalysts are generally employed in approximately mole quantities equal to the total mole quantities of one or more metal-ligand complexes of Formula (I).

The reaction conditions in the first reactor 110 for reacting ethylene monomer, $C_1-C_{12}$ α-olefin comonomer, and, optionally, hydrogen in the presence of the first catalyst—embodiments of which are provided above—will now be described.

To facilitate the reaction of ethylene monomer with $C_3-C_{12}$ α-olefin comonomer in the presence of the first catalyst, in embodiments the first reactor 110 is heated to a temperature from 155° C. to 190° C., such as from 160° C. to 190° C. from 165° C. to 190° C., from 170° C. to 190° C., from 175° C. to 190° C., from 180° C. to 190° C., or from 185° C. to 190° C. In embodiments, the first reactor is heated to a temperature from 155° C. to 185° C., such as from 155° C. to 180° C., from 155° C. to 175° C., from 155° C. to 170° C., from 155° C. to 165° C., or from 155° C. to 160° C. It should he understood that the above temperature ranges include the endpoints recited therein (e.g., "from 155° C. to 190° C." includes both 155° C. and 190° C.) and the temperature of the first reactor 110 may be measured with any conventional reactor temperature monitoring systems and software.

The feed stream 101 that is introduced in to the first reactor 110. In embodiments, comprises a high concentration of ethylene monomer. In some embodiments, the feed stream 101 comprises from 70 grams per liter (g/L) to 135 g/L ethylene monomer. In some embodiments, the feed stream 101 comprises from 75 g/L to 135 g/L ethylene monomer, such as from 80 g/L to 135 g/L ethylene monomer, from 85 g/L to 135 g/L, ethylene monomer, from 90 g/L to 135 g/L ethylene monomer, from 95 g/L to 135 g/L ethylene monomer, from 100 g/L to 135 g/L ethylene monomer, from 105 g/L to 135 g/L ethylene monomer, from 110 g/L to 135 g/L ethylene monomer, from 115 g/L to 135 g/L ethylene monomer, from 120 g/L to 135 g/L ethylene monomer, from 125 g/L to 135 g/L ethylene monomer, or from 130 g/L to 135 g/L ethylene monomer. In other embodiments, the feed stream 101 comprises from 70 g/L to 130 g/L ethylene monomer, such as from 70 g/L to 125 g/L ethylene monomer, from 70 g/L to 120 g/L ethylene monomer, from 70 g/L to 115 g/L ethylene monomer, from 70 g/L to 110 g/L ethylene monomer, from 70 g/L to 105 g/L ethylene monomer, from 70 g/L to 100 g/L ethylene monomer, from 70 g/L to 95 g/L ethylene monomer, from 70 g/L to 90 g/L ethylene monomer, from 70 g/L to 85 g/L ethylene monomer, from 70 g/L to 80 g/L ethylene monomer, or from 70 g/L to 75 g/L ethylene monomer.

The concentration of comonomer in the feed stream 101 is not limited and can be present in a concentration from 0.0 g/L to 95.0 g/L, such as from 5.0 g/L to 95.0 g/L, from 15.0 g/L to 95.0 g/L, from 25.0 g/L to 95.0 g/L, from 35.0 g/L to 9.5.0 g/L, from 45.0 g/L to 95.0 g/L, from 55.0 g/L to 95.0 g/L, from 65.0 g/L, to 95.0 g/L, from 75.0 g/L to 95.0 g/L, or from 85.0 g/L to 95.0 g/L. In some embodiments, the concentration of comonomer in the feed stream 101 is from 0.0 g/L to 90.0 g/L, from 0.0 g/L to 80.0 g/L, from 0.0 g/L to 70.0 g/L, from 0.0 g/L to 60.0 g/L, from 0.0 g/L to 50.0 g/L, from 0.0 g/L to 40.0 g/L, from 0.0 g/L to 30.0 g/L, from 0.0 g/L to 20.0 g/L, or from 0.0 g/L to 10.0 g/L.

In embodiments, the first catalyst is present in the first reactor 110 at a concentration from 0.06 micromole per liter (μmol/L) to 3.00 μmol/L, such as from 0.500 μmol/L to 3.00 μmol/L, from 1.00 μmol/L to 3.00 μmol/L, from 1.50 μmol/L to 3.00 μmol/L, from 2.00 μmol/L to 3.00 μmol/L, or from 2.50 μmol/L to 3.00 μmol/L. In embodiments, the first catalyst is present in the first reactor 110 at a concentration from 0.06 μmol/L, to 2.50 μmol/L, such as from 0.06 μmol/L to 2.00 μmol/L, from 0.06 μmol/L to 1.50 μmol/L, from 0.06 μmol/L to 1.00 μmol/L, from 0.06 μmol/L to 0.500 μmol/L, from 0.06 μmol/L to 0.250 μmol/L, or from 0.06 μmol/L to 0.100 μmol/L.

Under these reaction conditions, ethylene monomer, $C_3$-$C_{12}$ α-olefin comonomer, and, optionally, hydrogen react in the presence of the first catalyst, such as, for example, the catalysts described above, to form the first polymer fraction. In embodiments, this first polymer fraction is lower in density and lower in melt index ($I_2$) than the second polymer fraction formed in the mixer 130.

As described previously in his disclosure, at least the first polymer fraction, unreacted ethylene monomer, and unreacted $C_3$-$C_{12}$ α-olefin comonomer exit the first reactor 110 in effluent 111a. A second catalyst is introduced to the effluent 111a via second catalyst stream 112 causing the unreacted ethylene monomer and unreacted $C_1$-$C_{12}$ α-olefin comonomer to react in the presence of the second catalyst and form a second polymer fraction. The high concentration of ethylene monomer present in both the feed stream 101 and the effluent 111a ensures there is sufficient ethylene present when the second catalyst stream 112 is introduced to the effluent 111a at mixer 130 to allow for formation of the second polymer fraction.

In embodiments, the effluent 111a comprises from 20 grams per liter (g/L) to 45 g/L ethylene monomer. In some embodiments, the effluent 111a comprises from 25 g/L to 45 g/L ethylene monomer, such as from 301 g/L to 45 g/L ethylene monomer, from 35 g/L to 45 g/L ethylene monomer, or from 40 g/L to L ethylene monomer. In other embodiments, effluent 111a comprises from 20 g/L to 40 g/L ethylene monomer, such as from 20 g/L to 35 g/L ethylene monomer, from 20 g/L to 30 g/L ethylene monomer, or from 20 g/L to 25 g/L ethylene monomer.

As the modified effluent 111b comprising ethylene monomer, $C_3$-$C_{12}$ α-olefin comonomer, second catalyst, and second polymer fraction travels through the mixer 130 toward the second reactor 120, the ethylene monomer and $C_3$-$C_{12}$ α-olefin comonomer present in the modified effluent 111b continue to react in the presence of the second catalyst to form second polymer fraction. It should be understood that the temperature where the second catalyst stream 112 is introduced to the effluent 111a is approximately equal to the temperature within the first reactor 110 (i.e., from 155° C. to 190° C.), which is lower than the temperature in the second reactor. Further, although ethylene monomer is reacted in the first reactor 110 to form the first polymer fraction, the amount of ethylene introduced into the first reactor 110 is such that the concentration of unreacted ethylene monomer in the effluent 111a is sufficient to form second polymer fraction. In some embodiments, additional, fresh ethylene monomer may be added to either the effluent 111a (i.e., before the second catalyst stream 112 is introduced to the effluent) or to the modified effluent 111b (i.e., after the second catalyst stream 112 is introduced to the effluent). In embodiments, reactions of ethylene monomer and $C_3$-$C_{12}$—-olefin comonomer in the presence of the second catalyst occur in the mixer 130. Reacting ethylene monomer and $C_3$-$C_{12}$ α-olefin comonomer in the presence of the second catalyst before the modified effluent 111b is introduced into the second reactor 120 produces a second polymer fraction that has a high molecular weight high density fraction, which in turn results in a bimodal ethylene-based polymer with better balance of density and melt index. Without being bound by any particular theory, it is believed that the relatively low temperature of the modified effluent 111b and the high concentration of ethylene monomer in the modified effluent 111b results in increased propagation rates, such as, for example, propagation rates 2 to 4 times higher than propagation rates achieved in conventional processes where a second catalyst is added at the second reactor and at higher temperatures. It is believed that the increased propagation rate provides a high molecular weight high density fraction in the bimodal ethylene-based polymer.

The second catalyst that is introduced to the effluent 111a via the second catalyst stream 112 is, in embodiments, a Ziegler-Matta catalyst or a second molecular catalyst— which were described in detail above. In embodiments, exemplary Ziegler-Natta catalysts are those derived from (1) organomagnesium compounds, (2) alkyl halides or aluminum halides or hydrogen chloride, and (3) a transition metal compound. Examples of such catalysts are described in U.S. Pat. Nos. 4,314,912 (Lowery, Jr. et al), U.S. Pat. No. 4,547,475 (Glass et al.), and U.S. Pat. No. 4,612,300 (Coleman, III), the teachings of which are incorporated herein by reference in their entirety. The Ziegier-Natta procatalyst may be formed by (a) reacting a hydrocarbon-soluble organomagnesium compound or complex thereof and an active non-metallic or metallic halide to form a halogenated magnesium support; b) contacting the magnesium halide support with a conditioning compound containing an element selected from the group consisting of boron, aluminum, gallium, indium and tellurium under conditions sufficient to form a conditioned magnesium halide support; (c) contacting the magnesium halide support and a compound containing, as a first metal, titanium, to form a supported titanium compound; and (d) optionally, contacting the supported titanium compound and a second metal and optionally a third metal independently selected from the transition metal series, provided that the second metal and the third metal are not the same; and further provided that the molar ratio of the magnesium to a combination of the titanium and the second and third metals ranges from 30:1 to 5:1; all under conditions sufficient to form a procatalyst.

Particularly suitable organomagnesium compounds for use in Ziegler-Nana catalysts include, for example, hydrocarbon soluble dihydrocarbylmagnesium such as the magnesium dialkyls and the magnesium diaryls. Exemplary suitable magnesium dialkyls include particularly n-butyl-secbutylmagnesium, diisopropylmagnesium, di-n-hexyl-magnesium, isopropyl-n-butyl-magnesium, ethyl-n-hexyl-magnesium, ethyl-n-butylmagnesium, di-n-octylmagnesium and others wherein the alkyl has from 1 to 20 carbon atoms. Exemplary suitable magnesium diaryls include diphenyl-magnesium, dibenzylmagnesium and ditolylmagnesium. Suitable organomagnesium compounds include alkyl and aryl magnesium alkoxides and aryloxides and aryl and alkyl magnesium halides. In some embodiments, the organomagnesium compound is a halogen-free organomagnesium.

The modified effluent 111b which comprises unreacted methylene, unreacted $C_3$-$C_{12}$ α-olefin comonomer, second catalyst, first polymer fraction, and second polymer fraction—is present in the mixer 130 for a duration from 3 minutes to 6 minutes, such as from 3 minutes to 5 minutes, or from 3 minutes to 4 minutes before it is introduced into the second reactor 120.

After the modified effluent 111b is introduced into the second reactor 120, which is a non-agitated solution polymerization reactor, the modified effluent 111b is heated to a temperature that is greater than the temperature in the first reactor 110 and greater than the temperature of the modified effluent 111b in the mixer 130. In embodiments, the temperature within the second reactor 120 is from 190° C. to 265° C. The temperature within the second reactor 120 is, in some embodiments, from 195° C. to 265° C., such as from 200° C. to 265° C., from 205° C. to 265° C., from 210° C. to 265° C., from 215° C. to 265° C., from 220° C. to 265° C., from 225° C. to 265° C., from 230° C. to 265° C., from 235° C. to 265° C., from 240° C. to 265° C., from 240° C. to 265° C., from 245° C. to 265° C., from 250° C. to 265° C., or from 255° C. to 265° C. In other embodiments, the temperature within the second reactor is from 190° C. to 260° C., such as from 190° C. to 255° C., from 190° C. to 250° C., from 190° C. to 245° C., from 190° C. to 240° C., from 190° C. to 235° C., from 190° C. to 230° C., from 190° C. to 225° C., from 190° C. to 220° C., from 190° C. to 215° C., from 190° C. to 210° C., from 190° C. to 205° C., from 190° C. to 200° C., or from 190° C. to 195° C. It should be understood that the above temperature ranges include the endpoints recited therein (e.g., "from 190° C. to 265° C." includes both 190° C. and 265° C.) and the temperature of the second reactor 120 may be measured with any conventional reactor temperature monitoring systems and software.

The unreacted ethylene monomer and unreacted $C_3$-$C_{12}$ α-olefin comonomer in the modified effluent 111b that enters the second reactor 120 will react in the presence of the second catalyst to form additional second polymer fraction. In addition, a second feed stream 121 that comprises ethylene monomer and $C_3$-$C_{12}$ α-olefin comonomer in solvent is introduced into the second reactor 120. The ethylene monomer and $C_3$-$C_{12}$ α-olefin comonomer from the second feed stream 121 will also react in the presence of the second catalyst to form additional second polymer fraction. It should be understood that although FIG. 1 depicts second feed stream 121 as a single feed stream, the components may be individually introduced into the second reactor 120.

Figure 2:
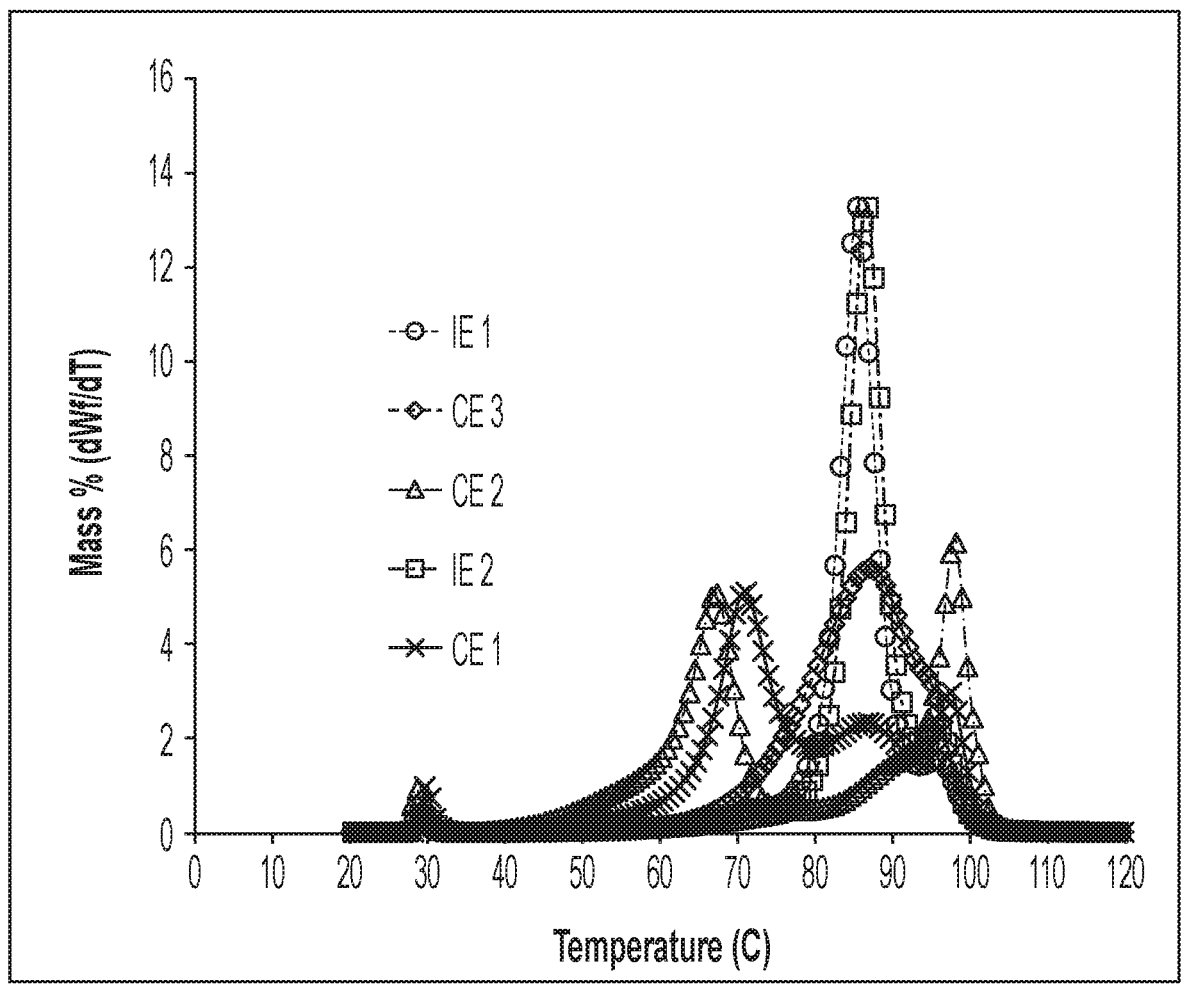
FIG. 2 graphically depicts a CEF plot for polymers according to embodiments and comparative examples.

After a sufficient amount of time in the second reactor 120, product stream 122 that comprises a bimodal ethylene-based polymer exits the second reactor 120. Properties of the bimodal ethylene-based polymer present in product stream 122 will be described in more detail below. Although not shown in FIG. 1 and FIG. 2, it should be understood that any unreacted ethylene monomer, unreacted $C_3$-$C_{12}$ α-olefin comonomer, and solvent present in product stream 122 may be separated from the bimodal ethylene-based polymer and recycled back to the system 100 or 200 in feed stream 101 to the first reactor 110 or in second feed stream 121 to the second reactor 120.

The over conversion rate of ethylene monomer in the system 100 is from 90% to 94%, such as from 91% to 94%, from 92% to 94%, or from 93% to 94%.

Bimodal Ethylene-Based Polymer Properties

Exemplary properties of bimodal ethylene-based polymers produced according to embodiments disclosed and described herein will now be provided. As noted above, and without being bound to any particular theory, it is believed that the combination of the exemplary properties listed below is made possible by the processes and systems disclosed and described hereinabove.

According to embodiments, the bimodal ethylene-based polymer may have a density from 0.900 to 0.925 g/cc measured according to ASTM D792. In some embodiments, the bimodal ethylene-based polymer has a density from 0.905 g/cc to 0.925 g/cc, such as from 0.910 g/cc to 0.925 g/cc, from 0.915 g/cc to 0.925 g/cc, or from 0.920 g/cc to 0.925 g/cc. In other embodiments the bimodal ethylene-based polymer has a density from 0.900 g/cc to 0.920 g/cc, such as from 0.900 g/cc to 0.915 g/cc, from 0.900 g/cc to 0.910 g/cc, or from 0.900 g/cc to 0.905 g/cc. In yet other embodiments, the bimodal ethylene-based polymer has a density from 0.905 g/cc to 0.920 g/cc, such as from 0.910 g/cc to 0.915 g/cc. In still other embodiments, the bimodal ethylene-based polymer has a density from 0.910 g/cc to 0.920 g/cc, or from 0.910 g/cc to 0.918 g/cc. It should be understood that the above density ranges include the endpoints recited therein.

The bimodal ethylene-based polymers of embodiments have a high density fraction (HDF)—measured by crystallization elution fractionation (CEF) integration at temperatures from 93° C. to 119° C.—from 3.0% to 25.0%, such as from 5.0% to 25.0%, from 7.5% to 25.0%, from 10.0% to 25.0%, from 12.5% to 25.0%, from 15.0% to 25.0%, from 17.5% to 25.0%, from 20.0% to 25.0%, or from 22.5% to 25.0%. In other embodiments, the bimodal ethylene-based polymers of embodiments have an HDF from 3.0% to 22.5%, such as from 3.0% to 20.0%, from 3.0% to 17.5%, from 3.0% to 15.0%, from 3.0% to 12,5%, from 3.0% to 10.0%, from 3.0% to 7.5%, or from 3.0% to 5,0%. In still other embodiments the bimodal ethylene-based polymers of embodiments have an HDF from 5.0% to 22.5%, such as from 7.5% to 20.0%, from 10.0% to 17.5%, or from 12.5% to 15.0%. It should be understood that the above HDF ranges include the endpoints recited therein.

in embodiments, the bimodal ethylene-based polymer has a melt index (I2)—measured according to ASTM D 1238 at a load of 2.16 kg—from 0.5 grams per 10 minutes (g/10 mins) to 2.0 g/10 mins, such as from 0.7 g/10 mins to 2.0 g/10 mins, from 0.9 g/10 mins to 2.0 g/10 mins, from 1.0 g/10 mins to 2.0 g/10 mins, from 1.2 g/10 mins to 2.0 g/10 mins, from 1.4 g/10 mins to 2.0 g/10 rains, from 1.6 g/10 mins to 2.0 g/10 mins, or from 1.8 g/10 mins to 2.0 g/10 mins. In other embodiments, the bimodal ethylene-based polymer has an $I_2$ from 0.5 g/10 mins to 1.8 g/10 mins, such as from 0.5 g/10 mins to 1.6 g/10 mins, from 0.5 g/10 mins to 1.4 g/10 mins, from 0.5 g/10 mins to 1.2 g/10 mins, from 0.5 g/10 mins to 1.0 g/10 mins, from 0.5 g/10 mins to 0.9 g/10 mins, or from 0.5 g/10 mins to 0.7 g/10 mins. In yet other embodiments, the bimodal ethylene-based polymer has an $I_2$ from 0.7 g/10 mins to 1.8 g/10 mins, such as from 0.9 g/10 mins to 1.6 g/10 mins, from 1.0 g/10 mins to 1.4 g/10 mins, or from 1.1 g/10 mins to 1.2 g/10 mins, or from 3.0 g/10 mins to 3.5 g/10 mins. It should be understood that the above $I_2$ ranges include the endpoints recited therein.

The bimodal ethylene-based polymer may have an $I_{10}/I_2$ ratio—where $I_2$ is the melt index when measured according to ASTM D 1238 at a load of 2.16 kg and temperature of 190° C. and $I_{10}$ is the melt index when measured according to ASTM D 1238 at a load of 10 kg and temperature of 190° C.—from 5.5 to 7.5, such as from 6.0 to 7.5, from 6.5 to 7.5, or from 7.0 to 7.5, from 7.0 to 7.5. In some embodiments, the bimodal ethylene-based polymer may have an $I_{10}/I_2$ ratio from 5.5 to 7.0, such as from 5.5 to 6.5. or from 5.5 to 6.0. In yet other embodiments, the bimodal ethylene-based polymer has an $I_{10}/I_2$ ratio from 6.0 to 7.0. It should be understood that the above $I_{10}/I_2$ ratio ranges include the endpoints recited therein.

The short chain branching distribution (SCBD) of bimodal ethylene-based polymers is, according to embodiments, less than 10° C.—measured by CEF full width at half height. In some embodiments, the SCBD of bimodal ethylene-based polymers is less than 9° C., less than 8° C., less than 7° C., less than 6° C., less than 5° C., less than 4° C., or less than 3° C. It should be understood that the above SCBD ranges include the endpoints recited therein.

The bimodal ethylene-based polymer has, according to embodiments, a zero shear viscosity ratio from 1.1 to 3.0, such as from 1.2 to 3.0, from 1.3 to 3.0, from 1.4 to 3.0, from 1.5 to 3.0, from 1.6 to 3.0, from 1.7 to 3.0, from 1.8 to 3.0, from 1,9 to 3,0, from 2.0 to 3.0, from 2.1 to 3.0, from 2.2 to 3.0, from 2.3 to 3.0, from 2.4 to 3.0, from 2.5 to 3.0, from 2.6 to 3.0, from 2.7 to 3.0, from 2.8 to 3.0, or from 2.9 to 3.0. In sonic embodiments, the bimodal ethylene-based polymer has a zero shear viscosity ration from 1.1 to 2.9, from 1.1 to 2.8, from 1.1 to 2.7, from 1.1 to 2.6, from 1.1 to 2.5, from 1.1 to 2.4, such as from 1.1 to 2.3, from 1.1 to 2.2, from 1.1 to 2.2, from 1.1 to 2.1, from 1.1 to 2.0, from 1.1 to 1.9, from 1.1 to 1.8, from 1.1 to 1.7, from 1.1 to 1.6, from 1,1 to 1.5, from 1.1 to 1.4, from 1.1 to 1.3, or from 1.1 to 1.2. In still other embodiments, the bimodal ethylene-based polymer has a zero shear viscosity ratio from 1.2 to 2.9, such as from 1.3 to 2.8, from 1.4 to 2.7, from 1.5 to 2.6, from 1.6 to 2.5, from 1.7 to 2.4, from 1.8 to 2.3, from 1.9 to 2.2, or from 2.0 to 2.1. It should be understood that the above zero shear viscosity ratio ranges include the endpoints recited therein.

A bimodal ethylene-based polymer, according o embodiments, comprises from 70.0 weight percent (wt. %) to 92.0 wt. % of the first polymer fraction and from 8.0 wt. % to 30.0 wt. % of the second polymer fraction. In some embodiments, the bimodal ethylene-based polymer comprises from 72.0 wt. % to 92.0 wt. % of the first polymer fraction, such as from 74.0 wt. % to 92.0 wt. % of the first polymer fraction, from 76.0 wt. % to 92.0 wt. % of the first polymer fraction, from 78.0 wt. % to 92.0 wt. % of the first polymer fraction, from 80.0 wt. % to 92.0 wt. % of the first polymer fraction, from 82.0 wt. % to 92.0 wt. % of the first polymer fraction, from 84.0 wt. % to 92.0 wt. % of the first polymer fraction, from 86.0 wt. % to 92.0 wt. % of the first polymer fraction, from 88.0 wt. % to 92.0 wt. % of the first polymer fraction, or from 90.0 wt. % to 92.0 wt. % of the first polymer fraction. In other embodiments, the bimodal ethylene-based polymer comprises from 70.0 wt. % to 90.0 wt. % of -the first polymer fraction, such as from 70.0 wt. % to 88.0 wt. % of the first polymer fraction, from 70.0 wt. % to 86.0 wt. % of the first polymer fraction, from 70.0 wt. % to 84.0 wt. % of the first polymer fraction, from 70.0 wt. % to 82.0 wt. % of the first polymer fraction, from 70.0 wt. % to 80.0 wt. % of the first polymer fraction, from 70.0 wt. % to 78.0 wt. % of the first polymer fraction, from 70.0 wt. % to 76.0 wt. % of the first polymer fraction, from 70.0 wt. % to 74.0 wt. % of the first polymer fraction, or from 70.0 wt. % to 72.0 wt. % of the first polymer fraction. In still other embodiments, the bimodal ethylene-based polymer comprises from 72.0 wt. % to 90.0 wt. % of the first polymer fraction, such as from 74.0 wt. % to 88.0 wt. % of the first polymer fraction, from 76.0 wt. % to 86.0 wt. % of the first polymer fraction, from 78.0 wt. % to 84.0 wt. % of the first polymer fraction, or from 80.0 wt. % to 82.0 wt. % of the first polymer fraction. It should be understood that the above weight percent ranges include the endpoints recited therein.

In some embodiments, the bimodal ethylene-based polymer comprises from 10.0 wt. % to 30.0 wt. % of the second polymer fraction, such as from 12 wt. % to 30.0 wt. % of the second polymer fraction, from 14.0 wt. % to 30.0 wt. % of the second polymer fraction, from 16.0 wt. % to 30.0 wt. % of the second polymer fraction, from 18.0 wt. % to 30.0 wt. % of the second polymer fraction, from 20.0 wt. % to 30.0 wt. % of the second polymer fraction, from 22.0 wt. % to 30.0 wt. % of the second polymer fraction, from 24.0 wt. % to 30.0 wt. % of the second polymer fraction, from 26.0 wt. % to 30.0 wt. % of the second polymer fraction, or from 28.0 wt. % to 30.0 wt. % of the second polymer fraction. In other embodiments, the bimodal ethylene-based polymer comprises from 8.0 wt. % to 28.0 wt. % of the second polymer fraction, such as from 8.0 wt. % to 26.0 wt. % of the second polymer fraction, from 8.0 wt. % to 24.0 wt. % of the second polymer fraction, from 8.0 wt. % to 22.0 wt. % of the second polymer fraction, from 8.0 wt. % to 20.0 wt. % of the second polymer fraction, from 8.0 wt. % to 18.0 wt. % of the second polymer fraction, from 8.0 wt. % to 16.0 wt. % of the second polymer fraction, from 8.0 wt. % to 14.0 wt. % of the second polymer fraction, or from 8.0 wt. % to 12.0 wt. % of the second polymer fraction. In still other embodiments, the bimodal ethylene-based polymer comprises from 10.0 wt. % to 28.0 wt. % of the second polymer fraction, from 12.0 wt. % to 26.0 wt. % of the second polymer fraction, from 14.0 wt. % to 24.0 wt. % of the second polymer fraction, from 16.0 wt. % to 22.0 wt. % of the second polymer fraction, or from 18.0 wt. % to 20.0 wt. % of the second polymer fraction. It should be understood that the above weight percent ranges include the endpoints recited therein.

The amount of each polymer fraction in the bimodal ethylene-based polymer may be adjusted based on the application or use. For example, a different balance of properties may be desirable in low temperature applications (e.g., below 0° C.) versus applications where the bimodal ethylene-based polymer is subjected to higher temperatures (e.g., temperatures greater than 40° C.).

In embodiments, the melt index and density of the second polymer fraction consists of the polymer fraction formed in the mixer 130 and the reaction environment of the second reactor 120. The polymer fraction made in the mixer 130 has a lower melt index (MI), and the polymer fraction formed in the second reactor 120 has higher MI (e.g., about 4 times higher than polymer fraction formed in the mixer 130). The combined second polymer fraction formed in the mixer 130 and the second reactor 120 has a high density fraction that is greater than the density of the first ethylene-based polymer fraction by at least 0.03 g/cc, such as greater than the density by at least 0.04 g/cc as shown by the CEF peak temperatures. In addition, using processes for forming a bimodal ethylene-based polymer according to embodiments disclosed and described herein, the final bimodal ethylene-based polymer (i.e., including the first polymer fraction and the second polymer fraction) has a higher density and higher melt index ($I_2$) than the first polymer fraction. Also, the portion of the second polymer fraction formed in the mixer has a higher molecular weight than the portion of the second polymer fraction formed in the second, non-agitated reactor.

In embodiments, the bimodal ethylene based polymer used in a blown film comprises a high density fraction (HDF) from 3.0% to 25.0%, wherein the high density fraction is measured by crystallization elution fractionation (CEF) integration at temperatures from 93° C. to 119° C.; an $I_{10}/I_2$ ratio from 5.5 to 7.5, wherein $I_2$ is the melt index when measured according to ASTM D 1238 at a load of 2.16 kg and temperature of 190° C. and $I_{10}$ is the melt index when measured according to ASTM D 1238 at a load of 10 kg and temperature of 190° C.; a short chain branching distribution (SCBD) less than or equal to 10° C. wherein the short chain branching distribution is measured by CEF full width at half height; a zero shear viscosity ratio from 1.0 to 2.5; a density from 0.902 g/cc to 0.925 g/cc, and a melt index ($I_2$) from 0.5 g/10 mins to 2.0 g/10 mins.

Blown Films and Properties

In embodiments, a blown film is formed by a blown film extrusion process where a bimodal ethylene-based polymer as disclosed above is melt extruded through an annular circular die thereby forming a tube. The tube is expanded by air, for example two or three times its diameter, and at the same time, the cooled air chills the web to a solid state. The degree of blowing or stretch determines the balance and level of tensile and impact properties. An internal air cooling ring may be used as well, in order to increase throughput rates and optical quality. Rapid cooling is essential to achieve the crystalline structure necessary to give clear, glossy films. The film tube is then collapsed within a V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such or may be slit and wound as a single-film layer onto one or more rolls. The tube may also be directly processed into bags.

In embodiments, a blown film is formed by a blown film extrusion process where a bimodal ethylene-based polymer as disclosed above is mixed with another polymer or additive and the mixture is melt extruded through an annular circular die thereby forming a tube. The tube is expanded by air, for example two or three times its diameter, and at the same time, the cooled air chills the web to a solid state. The degree of blowing or stretch determines the balance and level of tensile and impact properties. An internal air cooling ring may be used as well, in order to increase throughput rates and optical quality. Rapid cooling is essential to achieve the crystalline structure necessary to give clear, glossy films. The film tube is then collapsed within a V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such or may be slit and wound as a single-film layer onto one or more rolls. The tube may also be directly processed into bags.

In some processes, processing aids, such as plasticizers, can also be included in the bimodal ethylene-based polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex). Another suitable oil is TUFFLO oil (Lyondell Lubricants; Houston, Tex.).

in some processes, bimodal ethylene-based polymer compositions are treated with one or more stabilizers, for example, antioxidants, such as IRGANOX 1010 and IRGAFOS168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The bimodal ethylene-based polymer composition may, for example, comprise less than 10 percent by the combined weight of one or more additives, based on the weight of the inventive ethylene-based polymer composition.

The bimodal ethylene-based polymer composition produced may further be compounded. In some embodiments, one or more antioxidants may further be compounded into the bimodal ethylene-based polymer compositions and the compounded polymer pelletized. The compounded ethylene-based polymer composition may contain any amount of one or more antioxidants. For example, the compounded bimodal ethylene-based polymer compositions may comprise from about 200 to about 600 parts of one or more phenolic antioxidants per one million parts of the bimodal ethylene-based polymer compositions. In addition, the compounded ethylene-based polymer composition may comprise from about 800 to about 1200 parts of a phosphite-based antioxidant per one million parts of inventive ethylene-based polymer compositions.

The bimodal ethylene-based polymer compositions may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or nonwoven fabrics. Thermoplastic compositions comprising the bimodal ethylene-based polymer compositions include blends with other natural or synthetic materials, polymers, additives, reinforcing agents, ignition resistant additives, antioxidants, stabilizers, colorants, extenders, crosslinkers, blowing agents, and plasticizers.

Additives and adjuvants may be added to the inventive ethylene-based polymer compositions post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the bimodal ethylene-based polymer compositions with other polyolefins may be performed. Suitable polymers for blending with the inventive ethylene-based polymer compositions include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene (PE), including high pressure, free-radical low density polyethylene (LDPE), Ziegler-Natty linear low density polyethylene (LLDPE), metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, Acrylonitrile-Butadiene-Styrene (ABS), styrene/butadiene block copolymers and hydrogenated derivatives thereof (Styrene-Butadiene-Styrene (SBS) and Styrene-Ethylene-Butadiene-Styrene (SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the inventive ethylene-based polymer. Suitable polymers to mix with the bimodal ethylene-based polymer disclosed herein include, in embodiments, include LDPE and LLDPE, such as, for example, AGILITY 1200 (manufactured by The Dow Chemical Company).

Exemplary properties of blown films comprising bimodal ethylene-based polymers produced according to embodiments disclosed and described herein will now be provided. As described above, the molecular make-up of the bimodal ethylene-based polymer (e.g., the molecular weight distribution, branching structure, etc.) will affect the properties of the blown film made from the various bimodal ethylene-based polymers. It should be understood that the properties of the blown film disclosed herein may combined in any fashion within the scope of this disclosure. The following film properties were measured on a blown film produced as disclosed above—without mixing the bimodal ethylene-based polymer with another polymer—and having a thickness of approximately 2.0 mil.

Blown films of embodiments have average clarity ranging from 97.0% to 99.5%, such as from 97.5% to 99.5%, from 98.0% to 99.5%, from 98.5% to 99.5%, or from 99.0% to 99.5%. In embodiments the blown films have average clarity from 97.0% to 99.0%, such as from 97.0% to 98.5%, from 97.0% to 98.0%, or from 97.0% to 97.5%. In still other embodiments, the blown films have average clarity from 97.5% to 99.0%, such as from 98.0% to 98.5%. It should be understood that the above ranges include the endpoints recited therein.

In embodiments, blown films have average gloss from 50 to 75, such as from 55 to 75, from 60 to 75, from 65 to 75, or from 70 to 75. The blown films, according to some embodiments, have average gloss from 50 to 70, such as from 50 to 65, from 50 to 60, or from 50 to 55. In other embodiments, the blown film has average gloss from 55 to 70, such as from 60 to 65. It should be understood that the above ranges include the endpoints recited therein.

Blown films of embodiments have average bulk haze from 6.25% to 13.75%, such as from 6.50% to 13.75%, from 7.00% to 13.75%, from 7.50% to 13.75%, from 8.00% to 13.75%, from 8.50% to 13.75%, from 9.00% to 13.75%, from 9.50% to 13.75%, from 10.00% to 13.75%, from 10.50% to 13.75%, from 11.00% to 13.75%, from 11.50% to 13.75%, from 12.00% to 13.75%, from 12.50% to 13.75%, from 13.00% to 13.75%, or from 13.50% to 13.75%. In some embodiments, blown films have average bulk haze from 6.25% to 13.50%, such as from 6.25% to 13.00%, from 6.25% to 12.50%, from 6.25% to 12.00%, from 6.25% to 11.50%, from 6.25% to 11.00%, from 6.25% to 10.50%, from 6.25% to 10.00%, from 6.25% to 9.50%, from 6.25% to 9.00%, from 6.25% to 8.50%, from 6.25% to 8.00%, from 6.25% to 7.50%, from 6.25% to 7.00%, or from 6.25% to 6.50%. In other embodiments, the blown films have average bulk haze from 6.50% to 13.50%, such as from 7.00% to 13.00%, from 7.50% to 12.50%, from 8.00% to 12.00%, from 8.50% to 11.50%, from 9.00% to 11.00%, or from 9.50% to 10.50%. It should be understood that the above ranges include the endpoints recited therein.

According to embodiments, blown films have average dart impact strength from 450 g/mil to 700 g/mil, such as from 475 g/mil to 700 g/mil, from 500 g/mil to 700 g/mil, from 525 g/mil to 700 g/mil, from 550 g/mil to 700 g/mil, from 575 g/mil to 700 g/mil, from 600 g/mil to 700 g/mil, from 625 g/mil to 700 g/mil, from 650 g/mil to 700 g/mil, or from 675 g/mil to 700 g/mil. In embodiments, blown films have average dart impact strength from 450 g/mil to 675 g/mil, such as from 450 g/mil to 650 g/mil, from 450 g/mil to 625 g/mil, from 450 g/mil to 600 g/mil, from 450 g/mil to 575 g/mil, from 450 g/mil to 550 g/mil, from 450 g/mil to 525 g/mil, from 450 g/mil to 500 g/mil, or from 450 g/mil to 475 g/mil. In other embodiments blown films have average dart impact strength from 475 g/mil to 675 g/mil, such as from 500 g/mil to 650 g/mil, from 525 g/mil to 625 g/mil, or from 550 g/mil to 600 g/mil. It should be understood that the above ranges include the endpoints recited therein.

Blown films of embodiments have average puncture from 125.0 foot pound per cubic inch (ft·lb/in$^3$) to 175.0 ft·lb/in$^3$, such as from 130.0 ft·lb/in$^3$ to 175.0 ft·lb/in$^3$, from 135.0 ft·lb/in$^3$ to 175.0 ft·lb/in$^3$, from 140.0 ft·lb/in$^3$ to 175.0 ft·lb/in$^3$, from 145.0 ft·lb/in$^3$ to 175.0 ft·lb/in$^3$, from 150.0 ft·lb/in$^3$ to 175.0 ft·lb/in$^3$, from 155.0 ft·lb/in$^3$ to 175.0 ft·lb/in$^3$, from 160.0 ft·lb/in$^3$ to 175.0 ft·lb/in$^3$, from 165.0 ft·lb/in$^3$ to 175.0 ft·lb/in$^3$, or from 170.0 ft·lb/in$^3$ to 175.0 ft·lb/in$^3$. In embodiments, blown films have average puncture from 125.0 ft·lb/in$^3$ to 170.0 ft·lb/in$^3$, such as from 125.0 ft·lb/in$^3$ to 165.0 ft·lb/in$^3$, from 125.0 ft·lb/in$^3$ to 160.0 ft·lb/in$^3$, from 125.0 ft·lb/in$^3$ to 155.0 ft·lb/in$^3$, from 125.0 ft·lb/in$^3$ to 150.0 ft·lb/in$^3$, from 125.0 ft·lb/in$^3$ to 145.0 ft·lb/in$^3$, from 125.0 ft·lb/in$^3$ to 140.0 ft·lb/in$^3$, from 125.0 ft·lb/in$^3$ to 135.0 ft·lb/in$^3$, or from 125.0 ft·lb/in$^3$ to 130.0 ft·lb/in$^3$. In embodiments, blown films have average puncture from 130.0 ft·lb/in$^3$ to 170.0 ft·lb/in$^3$, such as from 135.0 ft·lb/in$^3$ to 165.0 ft·lb/in$^3$, from 140.0 ft·lb/in$^3$ to 160.0 ft·lb/in$^3$, or from 145.0 ft·lb/in$^3$ to 155.0 ft·lb/in$^3$. It should be understood that the above ranges include the endpoints recited therein.

Blown films of embodiments have average tear in the cross-machine direction (CD) from 325 g/mil to 550 g/mil, such as from 350 g/mil to 550 g/mil, from 375 g/mil to 550 g/mil, from 400 g/mil to 550 g/mil, from 425 g/mil to 550 g/mil, from 450 g/mil to 550 g/mil, from 475 g/mil to 550 g/mil, from 500 g/mil to 550 g/mil, or from 525 g/mil to 550 g/mil. In some embodiments, blown films have average tear in the CD from 325 g/mil to 525 g/mil, such as from 325 g/mil to 500 g/mil, from 325 g/mil to 475 g/mil, from 325 g/mil to 450 g/mil, from 325 g/mil to 425 g/mil, from 325 g/mil to 400 g/mil, from 325 g/mil to 375 g/mil, or from 325 g/mil to 350 g/mil. In some embodiments, blown films have average tear in the CD from 350 g/mil to 525 g/mil, such as from 375 g/mil to 500 g/mil, from 375 g/mil to 475 g/mil, or from 400 g/mil to 450 g/mil. It should be understood that the above ranges include the endpoints recited therein.

According to embodiments, blown films have average tear in the machine direction (MD) from 250 g/mil to 350 g/mil, such as from 275 g/mil to 350 g/mil, from 300 g/mil to 350 g/mil, or from 325 g/mil to 350 g/mil. In embodiments, blown films have average tear in the MD from 250 g/mil to 325 g/mil, such as from 250 g/mil to 300 g/mil, or from 250 g/mil to 275 g/mil. In embodiments, blown films have average tear in the MD from 275 g/mil to 325 g/mil. It should be understood that the above ranges include the endpoints recited therein.

Blown films of embodiments have average secant modulus in the CD from 10,000 pounds per square inch (psi) to 39,000 psi, such as from 15,000 psi to 39,000 psi, from 20,000 psi to 39,000 psi, from 25,000 psi to 39,000 psi, from 30,000 psi to 39,000 psi, or from 35,000 psi to 39,000 psi. In embodiments, blown films have average secant modulus in the CD from 10,000 psi to 35,000 psi, such as from 10,000 psi to 30,000 psi, from 10,000 psi to 25,000 psi, from 10,000 psi to 20,000 psi, or from 10,000 psi to 15,000 psi, In embodiments, blown films have average secant modulus in the CD from 15,000 psi to 35,000 psi, such as from 20,000 psi to 30,000 psi. It should be understood that the above ranges include the endpoints recited therein.

According to embodiments, blown films have average secant modulus in the MD from 10,000 pounds per square inch (psi) to 39,000 psi, such as from 15,000 psi to 39,000 psi, from 20,000 psi to 39,000 psi, from 25,000 psi to 39,000 psi, from 30,000 psi to 39,000 psi, or from 35,000 psi to 39,000 psi. In embodiments, blown films have average secant modulus in the MD from 10,000 psi to 35,000 psi, such as from 10,000 psi to 30,000 psi, from 10,000 psi to 25,000 psi, from 10,000 psi to 20,000 psi, or from 10,000 psi to 15,000 psi, In embodiments, blown films have average secant modulus in the MD from 15,000 psi to 35,000 psi, such as from 20,000 psi to 30,000 psi. It should be understood that the above ranges include the endpoints recited therein.

Blown films of embodiments have average tensile strength in the CD from 7500.0 psi to 8000.0 psi, such as from 7550.0 psi to 8000.0 psi, from 7600.0 psi to 8000.0 psi, from 7650.0 psi to 8000.0 psi, from 7700.0 psi to 8000.0 psi, from 7750.0 psi to 8000.0 psi, from 7800.0 psi to 8000.0 psi, from 7850.0 psi to 8000.0 psi, from 7900.0 psi to 8000.0 psi, or from 7950.0 psi to 8000.0 psi. In embodiments, blown films have average tensile strength in the CD from 7500.0 psi to 7950.0 psi, such as from 7500.0 psi to 7900.0 psi, from 7500.0 psi to 7850.0 psi, from 7500.0 psi to 7800.0 psi, from 7500.0 psi to 7750.0 psi, from 7500.0 psi to 7700.0 psi, from 7500.0 psi to 7650.0 psi, from 7500.0 psi to 7600.0 psi, or from 7500.0 psi to 7550.0 psi. In embodiments, films have average tensile strength in the CD from 7550.0 psi to 7950.0 psi, such as from 7600.0 psi to 7900.0 psi, from 7650.0 psi to 7850.0 psi, or from 7700.0 psi to 7800.0 psi. It should be understood that the above ranges include the endpoints recited therein.

In embodiments, blown films have average tensile strength in the MD from 8000.0 psi to 8700.0 psi, such as from 8050.0 psi to 8700.0 psi, from 8100.0 psi to 8700.0 psi, from 8150.0 psi to 8700.0 psi, from 8200.0 psi to 8700.0 psi, from 8250.0 psi to 8700.0 psi, from 8300.0 psi to 8700.0 psi, from 8350.0 psi to 8700.0 psi, from 8400.0 psi to 8700.0 psi, from 8450.0 psi to 8700.0 psi, from 8500.0 psi to 8700.0 psi, from 8550.0 psi to 8700.0 psi, from 8600.0 psi to 8700.0 psi, or from 8650.0 psi to 8700.0 psi. According to embodiments, blown films have average tensile strength in the MD from 8000.0 psi to 8650.0 psi, such as from 8000.0 psi to 8600.0 psi, from 8000.0 psi to 8550.0 psi, from 8000.0 psi to 8500.0 psi, from 8000.0 psi to 8450.0 psi, from 8000.0 psi to 8400.0 psi, from 8000.0 psi to 8350.0 psi, from 8000.0 psi to 8300.0 psi, from 8000.0 psi to 8250.0 psi, from 8000.0 psi to 8200.0 psi, from 8000.0 psi to 8150.0 psi, from 8000.0 psi to 8100.0 psi, or from 8000.0 psi to 8050.0 psi. In embodiments blown films have average tensile strength from 8050.0 psi to 8650.0 psi, such as from 8100.0 psi to 8600.0 psi, from 8150.0 psi to 8550.0 psi, from 8200.0 psi to 8500.0 psi, from 8250.0 psi to 8450.0 psi, or from 8300.0 psi to 8400.0 psi. It should be understood that the above ranges include the endpoints recited therein.

As disclosed above, forming blown films from bimodal ethylene-based polymers disclosed herein, a blown film have a good balance of optical properties, abuse properties, and mechanical properties can be formulated. That is to say, while individual optical properties, abuse properties, and mechanical properties of the blown films disclosed herein may not—when considered individually—perform better than other, known films; however, when the optical properties, abuse properties, and mechanical properties of the film are considered as a whole, the blown films disclosed herein perform better than other, known films. As an example, a blown film as disclosed herein may have abuse properties that are comparable with other, known films, but the blown film as disclosed herein will, for example, have better optical properties than the other, known film. Accordingly, heretofore, it was not possible to balance properties of blown films to have the overall performance of blown films disclosed and described herein.

Test Methods

The testing methods include: the following:

Melt index ($I_2$) and ($I_{10}$)

Melt index ($I_2$) values for the bimodal ethylene-based polymers measured in accordance to ASTM D1238 at 190° C. at 2.16 kg. Similarly, melt index ($I_{10}$) values for the bimodal ethylene-based polymers were measured in accordance to ASTM D1238 at 190° C. at 10 kg. The values are reported in g/10 min, which corresponds to grams eluted per 10 minutes. The melt index ($I_2$) values for the first ethylene-based component, the second ethylene-based component, and the third ethylene-based component were calculated according to Equation 30 and the methodology described below.

Density

Density measurements for the bimodal ethylene-based polymers were made in accordance with ASTM D792, Method B. For the first and second ethylene-based components, the density values were obtained using Equation 28 and the methodology described below. For the third ethylene-based component, the density value was calculated using Equation 29.

Conventional Gel Permeation Chromatography (conventional GPC)

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to ethylene-based polymer molecular weights using Equation 6 (as described in Williams and Ward, J. Polym. Sci., Polym. Let., 6, 621 (1968)).:

$$M_{polyethylene} = A \times (M_{polystyrene})^B \quad \text{(Equation 6)}$$

where M is the molecular weight, A has a value of 0.4315 and B is equal to 1.0.

A fifth order polynomial was used to fit the respective ethylene-based polymer-equivalent calibration points. A small adjustment to A (from approximately 0.39 to 0.44) was made to correct for column resolution and band-broadening effects such that NIST standard NBS 1475 is obtained at a molecular weight of 52,000 g/mol.

The total plate count of the GPC column set was performed with Eicosane (prepared at 0.04 g in 50 milliliters of TCB and dissolved for 20 minutes with gentle agitation). The plate count (Equation 7) and symmetry (Equation 8) were measured on a 200 microliter injection according to the following equations:

$$\text{Plate Count} = 5.54 \times \left( \frac{RV_{Peak\,Max}}{\text{Peak Width at half height}} \right)^2 \quad \text{(Equation 7)}$$

where RV is the retention volume in milliliters, the peak width is in milliliters, the peak max is the maximum height of the peak, and half height is one half of the height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad \text{(Equation 8)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the peak max and where front peak refers to the peak front at earlier retention volumes than the peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BI-IT) was added to a pre nitrogen-sparged septa-capped vial, via the PolymerChar high temperature autosampler. The samples were dissolved for 3 hours at 160° C. under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 9-12, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 6. Subsequently, a GPC molecular weight distribution (GPC-MWD) plot ($wt_{GPC}(lgMW)$ vs. lgMW plot, where $wt_{GPC}(lgMW)$ is the weight fraction of ethylene-based polymer molecules with a molecular weight of lgMW) for the ethylene-based polymer sample can be obtained. Molecular weight is in g/mol and $wt_{GPC}(lgMW)$ follows the Equation 9.

$$\int wt_{GPC}(lgMW) d lgMW = 1.00 \quad \text{(Equation 9)}$$

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum_i IR_i}{\sum_i (IR_i / M_{polyethylene,i})} \quad \text{(Equation 10)}$$

$$Mw_{(GPC)} = \frac{\sum_i (IR_i * M_{polyethylene,i})}{\sum_i IR_i} \quad \text{(Equation 11)}$$

-continued $$Mz_{(GPC)} = \frac{\sum_i (IR_i * M^2_{polyethylene,i})}{\sum_i (IR_i * M_{polyethylene,i})}$$ (Equation 12)

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 13. Processing of the flow marker peak was done via the PolymerChar GPCOne™ Software. Acceptable flow rate correction is such that the effective flowrate should be within 0.5% of the nominal flowrate.

Flow rate$_{effective}$=Flow rate$_{nominal}$×(RV(FM$_{calibrated}$)/RV(FM$_{sample}$)) (Equation 13)

IR5 GPC Comonomer Content (GPC-CC) Plot

A calibration for the IR5 detector rationing was performed using at least ten ethylene-based polymer standards (ethylene-based polymer homopolymer and ethylene/octene copolymers) of known short chain branching (SCB) frequency (The comonomer content of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29. 201-317, which are incorporated herein by reference), ranging from homopolymer (0 SCB/1000 total C) to approximately 50 SCR/1000 total C, where total C is equal to the carbons in backbone plus the carbons in branches. Each standard had a weight-average molecular weight from 36,000 g/mole to 126,000 g/mole and had a molecular weight distribution from 2.0 to 2.5, as determined by GPC. Typical Copolymer Standards properties and measurements are shown in Table A.

TABLE A

"Copolymer" Standards

| Wt. % Comonomer | IR5 Area ratio | SCB/1000 Total C | $M_{w(GPC)}$ g/mol | $M_{w(GPC)}/M_{n(GPC)}$ |
|---|---|---|---|---|
| 0.0 | 0.1809 | 0.0 | 38,400 | 2.20 |
| 1.1 | 0.1810 | 1.4 | 107,000 | 2.09 |
| 5.4 | 0.1959 | 6.8 | 37,400 | 2.16 |
| 8.6 | 0.2043 | 10.8 | 36,800 | 2.20 |
| 9.4 | 0.2031 | 11.8 | 103,200 | 2.26 |
| 14.0 | 0.2152 | 17.5 | 36,000 | 2.19 |
| 14.3 | 0.2161 | 17.9 | 103,600 | 2.20 |
| 23.1 | 0.2411 | 28.9 | 37,300 | 2.22 |
| 35.9 | 0.2708 | 44.9 | 42,200 | 2.18 |
| 39.2 | 0.2770 | 49.0 | 125,600 | 2.22 |

The "IR5 Area. Ratio (or "IR5$_{Methyl\ channel\ Area}$/IR5$_{Measurement\ Channel\ Area}$")" of "the baseline-subtracted area response of the IR5 methyl channel sensor" to "the baseline-subtracted area response of IR measurement channel sensor" (standard filters and filter wheel as supplied by PolymerChar: Part Number IR5_FWM01 included as part of the GPC-IR instrument) was calculated for each of the "Copolymer" standards. A linear fit of the Wt. % Comonomer versus the "IR5 Area Ratio" was constructed in the form of the following Equation 14:

wt % Comonomer=$A_0$+[$A_1$(IR5$_{Methyl\ Channel\ Area}$/IR5$_{Measurement\ Channel\ Area}$)] (Equation 14)

Therefore, a GPC-CC (GPC-Comonomer Content) plot (wt. % comonomer vs. lgMW) can be obtained. End-Group Correction of the wt. % Comonomer data can be made via knowledge of the termination mechanism if there is significant spectral overlap with the comonomer termination (methyls) via the molecular weight determined at each chromatographic slice.

Crystallization Elution Fractionation (CEF)

Comonomer distribution analysis, also commonly called short chain branching distribution (SCBD), is measured with Crystallization Elution Fractionation (CEF) (PolymerChar, Spain) (Monrabal et al, Macromol. Symp. 257, 71-79 (2007), which is incorporated herein by reference in its entirety) equipped with an IR (IR-4 or IR-5) detector (PolymerChar, Spain) and 2-angle light scattering detector Model 2040 (Precision Detectors, currently Agilent Technologies). Distilled anhydrous ortho-dichlorobenzene (ODCB) with 600 ppm antioxidant butylated hydroxytoluene (BHT) was used as solvent. For the autosampler with the capability of $N_2$ purge, no BHT was added. A GPC guard column (20 microns, or 10 microns, 50×7.5 mm) (Agilent Technologies) is installed just before the IR detector in the detector oven. Sample preparation is done with an autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization was at 0.052 ml/min. The flow rate during elution is at 0.50 ml/min. The data was collected at one data point/second.

The CFI column is packed by The Dow Chemical Company with glass beads at 125 μm±6% (MO-SCI Specialty Products) with ⅛-inch stainless tubing. Glass beads are acid washed by MO-SCI Specialty by request from The Dow Chemical Company. Column volume is 2.06 ml. Column temperature calibration was performed by using a mixture of NIST Standard Reference Material Linear ethylene-based polymer 1475 a (1.0 mg/ml) and Eicosane (2 mg/ml) in ODCB. Temperature was calibrated by adjusting elution heating rate so that NIST linear ethylene-based polymer 1475 a has a peak temperature at 101.0° C., and Eicosane has a peak temperature of 30.0° C. The CEF column resolution was calculated with a mixture of NIST linear ethylene-based polymer 1475 a (1.0 mg/ml) and hexacontane (Fluka, purum≥97.0%, 1 mg/ml). A baseline separation of hexacontane and NIST ethylene-based polymer 1475 a was achieved. The area of hexacontane (from 35.0 to 67.0° C.) to the area of NIST 1475 a from 67.0 to 110.0° C. is 50 to 50, the amount of soluble fraction below 35.0° C. is less than 1.8 wt %. The CEF column resolution is defined in Equation 15:

$$\text{Resolution} = \frac{\text{Peak Temperature}_{NIST1475A} - \text{Peak Temperature}_{Hexacontare}}{\text{Width at Half Height}_{NIST1475A} + \text{Width at Half Height}_{Hexacontare}} \geq 6.0 \quad \text{(Equation 15)}$$

where the half height width is measured in temperature and resolution is at least 6.0.

Short Chain Branching Distribution (SCBD)—CEF full width at half height

An additional parameter to describe the short chain branching distribution is the CEF full width at half height. This is done by the procedure outlined below:

(A) Obtain a weight fraction at each temperature (1) ($w_T(T)$) from 20.0° C. to 119.0° C. with a temperature step increase of 0.20° C. from CEF according to the following equation:

$$\int_{20.0}^{119.0} w_T(T)dT = 1, \text{ and} \quad \text{(Equation 16)}$$

(B) Obtain maximum peak height from CEF comonomer distribution profile by searching each data point for the highest peak from 35.0° C. to 119.0° C. The SCBD CEF full width at half height is defined as the entire temperature difference between the front temperature and the rear temperature at the half of the maximum peak height. The front temperature at the half of the maximum peak is searched forward from 35.0° C., and is the first data point that is greater than or equal to half of the maximum peak height. The rear temperature at the half of the maximum peak is searched backward from 119.0° C., and is the first data point that is greater than or equal to half of the maximum peak height.

The high density fraction (HDF) can be calculated as an integral from the CEF curve from 93° C. to 119° C. This is defined as the integral of the IR-4 chromatogram (baseline subtracted measurement channel) in the elution temperature ranging from 93° C. to 119° C. divided by the total integral from 20° C. to 140° C. according to the following equation:

$$HDF = \frac{\int_{93.0}^{119.0} IRdT}{\int_{20.0}^{140.0} IRdt} * 100\% \quad \text{(Equation 17)}$$

where T is the elution temperature (from the calibration discussed above).

Zero-Shear Viscosity Ratio (ZSVR)

Zero-shear viscosity ratio is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 18:

$$ZSVR = \frac{\eta_{0B}}{\eta_{0L}} = \frac{\eta_{0B}}{2.29^{-15} M_{w(convgpc)}^{3.65}}. \quad \text{(Equation 18)}$$

The ZSV value was obtained from creep test. at 190° C., via the method described above. The Mw(conv gpc) value was determined by the conventional GPC method (Equation 3), as discussed above. The correlation between ZSV of linear polyethylene and its Mw(conv gpc) was established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference—Society of Plastics Engineers (2008), 66th 887-891.

Clarity

Average Clarity is measured using BYK Gardner Hazegard as specified in ASTM D 1746.

Dart

Average Dart Impact Strength was measured according to ASTM-D 1709-04, Method A.

Gloss

Average Gloss was measured in accordance with ASTM D2457 using a BYK Gardner Glossmeter Microgloss 45°.

Bulk Haze

The average Bulk Haze was measured in accordance with ASTM D1003 using BYK Gardner Haze-gard.

Puncture Resistance

Puncture resistance is measured on a ZWICK model 1010 with TestXpertII software. The specimen size is 6"×6" and at least 5 measurements are made to determine an average puncture value. A 1000 Newton load cell is used with a round specimen holder. The specimen is a 4 inch diameter circular specimen. The Puncture resistance procedures follow ASTM D5748-95 standard, with modification to the probe described here. The puncture probe is a ½ inch diameter ball shaped polished stainless steel probe. There is no gauge length; the probe is as close as possible to, but not touching, the specimen. The probe is set by raising the probe until it touched the specimen. Then the probe is gradually lowered, until it is not touching the specimen. Then the crosshead is set at zero. Considering the maximum travel distance, the distance would be approximately 0.10 inch. The crosshead speed used is 250 mm/minute. The thickness is measured in the middle of the specimen. The thickness of the film, the distance the crosshead traveled, and the peak load are used to determine the puncture by the software. The puncture probe is cleaned after each specimen. The puncture force at break is the maximum peak load at break (in Newtons) and the puncture energy is the area under the curve of the load/elongation curve (in Joules).

Elmendorf Tear Resistance

Average Elmendorf Tear Resistance is measured in machine direction (MD) and cross-machine direction (CD) in accordance with ASTM D1922.

Secant Modulus

Average Secant modulus is measured in the machine direction (MD) and cross-machine direction (CD) in accordance with ASTM D882.

Tensile Strength

Average Tensile Strength is measured in the machine direction (MD) cross-machine direction (CD) in accordance with ASTM D882.

EXAMPLES

The following examples illustrate features of the present disclosure but are not intended to limit the scope of the disclosure.

EXAMPLE 1

This example compares two samples—Sample 1 and Sample 2—of films prepared according to embodiments disclosed and described herein (i.e., blown films formed with bimodal ethylene-based polymers have high molecular weight high density fractions) with blown films of Comparative Examples 1-3, which were, respectively, formed from commercially available ethylene-based polymers ELITE 5400, INNATE ST 50 (both manufactured by The Dow Chemical Company0, and EXCEED 1018 (manufactured by Exon Mobil Corporation).

In particular, Sample 1 is a bimodal ethylene-based polymer was formed using a loop reactor as the first reactor and a plug flow reactor as the second reactor. The feed stream into the first reactor included 1117 pounds per hour (lb/hr) ISOPAR-E solvent, 196 lb/hr ethylene monomer, 78 lb/hr octene. Hydrogen was also introduced into the first reactor at 6398 sccm. The first reactor exit ethylene concentration was 28 g/L. The first catalyst introduced into the first reactor included a procatalyst and a cocatalyst. The procatalyst was Zirconium,dimethyl[[2,2'''-[1,3-propanediylbis(oxy-κO)]bis [3'',5,5''-tris(1,1-dimethylethyl)-5'-methyl [1,1':3',1''-terphenyl]-2'-olato-κO]](2-)] having the following structure:

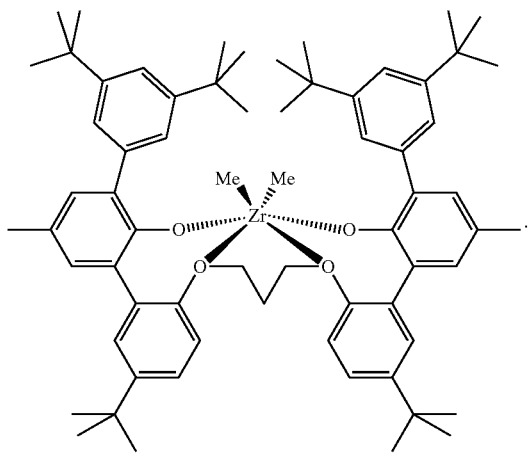

The procatalyst was added as needed to control 28 g/L reactor exit ethylene concentration and procatalyst loading was typically 0.15 μmol/L in the reactor exit. The cocatalyst was bis(hydrogenated tallow alkyl)methyl, tetrakis(pentafluorophenyl)borate(1-)amine.

The first reactor was heated to a temperature of 165° C. and the ethylene monomer and octene reacted in the presence of the first catalyst to form a first polymer fraction.

A second catalyst was added to the effluent downstream from the first reactor and upstream from the second reactor to form a modified effluent. The second catalyst was a Ziegler-Matta catalyst at a concentration of about 1.1 μmol/L. The modified effluent was introduced into the second, plug flow reactor where the unreacted ethylene and the unreacted octene and unreacted hydrogen reacted in the presence of the second catalyst to form a second polymer fraction.

Sample 2 is a bimodal ethylene-based polymer was formed using a loop reactor as the first reactor and a plug flow reactor as the second reactor. The feed stream into the first reactor included 1130 pounds per hour (lb/hr) ISOPAR-E solvent, 198 lb/hr ethylene monomer, and 72 lb/hr octene. Hydrogen was also introduced into the first reactor at 5523 sccm. The effluent ethylene concentration was 30 g/L. The first catalyst introduced into the first reactor included a procatalyst and a cocatalyst. The procatalyst was of chemical formula $C_{86}H_{126}F_2GeO_4Zr$ and had the following structure:

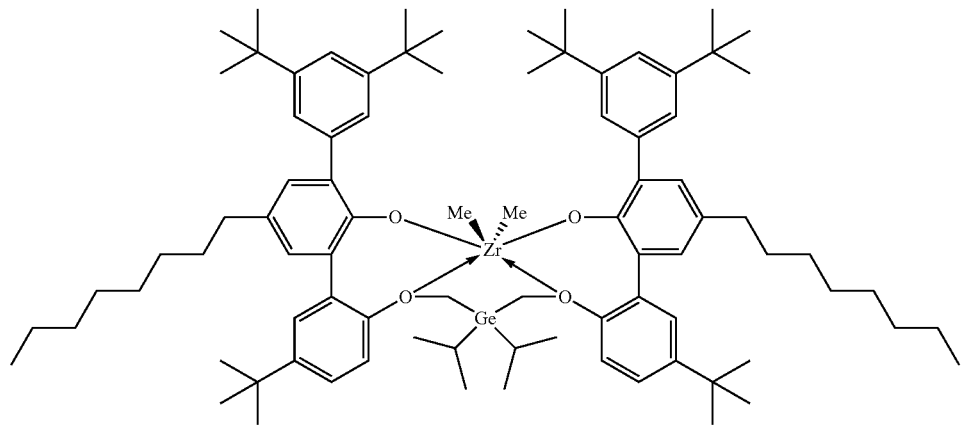

The procatalyst was added as needed to control 30 g/L ethylene concentration in the effluent, and the procatalyst loading was typically 0.12 μmol/L in the effluent. The cocatalyst was bis(hydrogenated tallow alkyl)methyl, tetrakis(pentafluorophenyl)borate(1-)amine.

The first reactor was heated to a temperature of 165° C. and the ethylene monomer and hexene reacted in the presence of the first catalyst to form a first polymer fraction.

A second catalyst was added to the effluent downstream from the first reactor and upstream from the second reactor to form a modified effluent. The second catalyst was a Ziegler-Matta catalyst at a concentration of about 0.8 μmol/L The modified effluent was introduced into the second, plug flow reactor where the unreacted ethylene and the unreacted octene and unreacted hydrogen reacted in the presence of the second catalyst to form a second polymer fraction.

The resulting bimodal ethylene-based polymer samples had the properties shown in Table B, which were measured according to the techniques disclosed and described herein.

TABLE B

|  | SAMPLE 1 | SAMPLE 2 | COMP. SAMPLE 1 | COMP. SAMPLE 2 | COMP. SAMPLE 3 |
|---|---|---|---|---|---|
| $I_{10}/I_2$ | 6.72 | 5.70 | 8.2 | 7.7 | 6.0 |
| HDF (%) | 9.03 | 11.91 | 16.8 | 31.6 | 15.10 |
| SCBD (° C.) | 4.8 | 4.8 | 30.8 | 35.6 | 17.2 |
| ZSVR | 2.51 | 1.58 | 2.13 | 1.53 | 1.35 |
| DENSITY (g/cc) | 0.9182 | 0.9179 | 0.9162 | 0.9174 | 0.9191 |

TABLE B-continued

|  | SAMPLE 1 | SAMPLE 2 | COMP. SAMPLE 1 | COMP. SAMPLE 2 | COMP. SAMPLE 3 |
|---|---|---|---|---|---|
| MELT INDEX ($I_2$; g/10 mins) | 0.87 | 0.91 | 0.93 | 0.83 | 0.95 |

The bimodal ethylene-based polymers of Sample 1 and Sample 2 and of Comparative Samples 1-3 were formed into blown films on a Sterling extruder, equipped with a semi grooved barrel of ID 3.5 inch; 30/1 L/D ratio; a barrier screw, and an Alpine air ring. The extrusion line had an 8 inch die with internal bubble cooling. The blown film line had the following properties as listed in Table C as follows. In addition, three comparative blown films were formed on the same blown film line using the polyethylene-based polymers of Comparative Examples 1-3. Each blown film in this example had a thickness of 2 mil.

TABLE C

| Blown Film Line Parameters | |
|---|---|
| Die | 8 in |
| Die gap | 70 mil |
| (BUR) | 2.5:1 |
| Bubble cooling | IBC |
| Output | 10 lb/hr/in of die (250 lb/hr) |
| Melt Temperature | 430° F. |
| Frost Line Height | 35 in |

Properties of the blown films prepared form the polymers of Samples 1 and 2 and Comparative Samples 1-3 were measured according to the test parameters disclosed herein, and are provided in Table D.

TABLE D

|  | SAMPLE 1 | SAMPLE 2 | C. SAMPLE 1 | C. SAMPLE 2 | C. SAMPLE 3 |
|---|---|---|---|---|---|
| Thickness (mm) | 2.0 | 2.0 | 2.0 | 2.0 | 2.0 |
| OPTICAL PROPERTIES | | | | | |
| Average Clarity (%) | 98.10 | 99.46 | 98.82 | 97.26 | 92.80 |
| Average Gloss | 56.02 | 71.39 | 58.15 | 46.12 | 32.06 |
| Average Haze (%) | 13.53 | 6.52 | 11.50 | 16.84 | 25.70 |
| ABUSE PROPERTIES | | | | | |
| Average Dart (g) | 1192 | 1348 | 1144 | 1740 | 1345 |
| Average Puncture (ft · lb/in³) | 134.6 | 174.2 | 168.5 | 154.0 | 183.5 |
| Average Tear CD ($g_f$) | 1015.0 | 765.9 | 990.6 | 977.2 | 659.5 |
| Average Tear - MD ($g_f$) | 606.5 | 603.5 | 641.4 | 617.3 | 589.0 |
| Average Secant Modulus - CD (psi) | 36,329 | 38,967 | 44,087 | 52,865 | 40,900 |
| MECHANICAL PROPERTIES | | | | | |
| Average Secant Modulus - MD (psi) | 32,687 | 33,431 | 38,711 | 42,401 | 38,019 |
| Average Tensile Strength - CD (psi) | 7603.0 | 7805.1 | 7394.2 | 5048.8 | 6613.6 |
| Average Tensile Strength - MD (psi) | 8107.4 | 8528.0 | 5748.0 | 6911.8 | 6237.8 |

As can be seen from the properties of the blown films of Example 1, the blown films of Sample 1 and Sample 2, which were prepared according to embodiments disclosed and described herein, had abuse and mechanical properties that were comparable with Comparative Samples 1-3, which were prepared from conventional ethylene-based polymers, but Sample 1 and Sample 2 had improved optical properties films were formed from these polymer mixtures using the same blown film line and properties as disclosed in Example 1.

Properties of the blown films prepared for the polymers of Samples 1 and 2 and Comparative Samples 1-3 were measured according to the test parameters disclosed herein, and are provided in Table E.

TABLE E

|  | SAMPLE 1 | SAMPLE 2 | C. SAMPLE 1 | C. SAMPLE 2 | C. SAMPLE 3 |
|---|---|---|---|---|---|
| Thickness (mm) | 2.0 | 2.0 | 2.0 | 2.0 | 2.0 |
| OPTICAL PROPERTIES | | | | | |
| Average Clarity (%) | 97.90 | 98.72 | 96.16 | 97.14 | 98.54 |
| Average Gloss | 65.83 | 70.71 | 55.99 | 50.89 | 71.73 |
| Average Haze (%) | 7.70 | 5.93 | 10,64 | 12,68 | 6.37 |
| ABUSE PROPERTIES | | | | | |
| Average Dart (g) | 666 | 762 | 728 | 1044 | 720 |
| Average Puncture (ft · lb/in$^3$) | 174.6 | 182.6 | 164.3 | 153.4 | 158.9 |
| Average Tear - CD (ge) | 1131.7 | 1117.9 | 1227.9 | 1262.3 | 1028.6 |
| Average Tear - MD (gr) | 454.3 | 460.7 | 482.1 | 513.6 | 453.0 |
| MECHANICAL PROPERTIES | | | | | |
| Average Secant Modulus - CD (psi) | 40,994 | 40,803 | 36,956 | 46,906 | 39,172 |
| Average Secant Modulus - MD (psi) | 35,081 | 34,980 | 34,101 | 39,567 | 34,766 |
| Average Tensile Strength - CD (psi) | 7683.1 | 7815.7 | 6435.6 | 7008.7 | 7930.6 |
| Average Tensile Strength - MD (psi) | 6998.1 | 7922.1 | 7072.5 | 7201.6 | 7641.7 | when compared to Comparative Samples 1-3, which shows the improved balance of optical properties, abuse properties, and mechanical properties of blown films made according to embodiments disclosed and described herein.

EXAMPLE 2

This example compares two samples of films prepared according to embodiments disclosed and described herein (i.e., blown films formed with bimodal ethylene-based polymers have high molecular weight high density fractions) mixed with 10 wt. % LDPE (AGILITY 1200 manufactured by The Dow Chemical Company) with blown films formed from commercially available ethylene-based polymers mixed with 10 wt. % LDPE (AGILITY 1200 manufactured by the Dow Chemical Company).

The blown films of Sample 1 and Sample 2 are made from the bimodal ethylene-based polymer of Sample 1 and Sample 2, respectively, from Example 1 mixed with 10 wt. % AGILITY 1200. Blown films for this example were formed from these polymer mixtures (i.e., bimodal ethylene-based polymer mixed with AGILITY 1200) using the same blown film line and properties as disclosed in Example 1. Likewise, Comparative Samples 1-3 of this example were made from the polymers of Samples 1-3, respectively, from Example 1 mixed with 10 wt. % AGILITY 1200, and blown As can be seen from the properties of the blown films of Example 2, the blown films of Sample 1 and Sample 2, which were prepared according to embodiments disclosed and described herein mixed with 10 wt. % LDPE, had abuse and mechanical properties that were comparable with Comparative Samples 1-3, which were prepared from conventional ethylene-based polymers mixed with 10 wt. % LDPE, but Sample 1 and Sample 2 had improved optical properties when compared to Comparative Samples 1-3, which shows the improved balance of optical properties, abuse properties, and mechanical properties of blown films made according to embodiments disclosed and described herein even when mixed with LDPE.

EXAMPLE 3

This example compares two samples of films prepared according to embodiments disclosed and described herein (i.e., blown films formed with bimodal ethylene-based polymers have high molecular weight high density fractions) mixed with 20 wt. % LDPE (AGILITY 1200 manufactured by The Dow Chemical Company) with blown films formed from commercially available ethylene-based polymers mixed with 20 wt. % LDPE (AGILITY 1200 manufactured by the Dow Chemical Company).

The blown films of Sample 1 and Sample 2 are made from the bimodal ethylene-based polymer of Sample 1 and Sample 2, respectively, from Example 1 mixed with 20 wt. % AGILITY 1200. Blown films for this example were formed from these polymer mixtures (i.e., bimodal ethylene-based polymer mixed with AGILITY 1200) using the same blown film line and properties as disclosed in Example 1. Likewise, Comparative Samples 1-3 of this example were made from the polymers of Samples 1-3, respectively, from Example 1 mixed with 20 wt. % AGILITY 1200, and blown films were formed from these polymer mixtures using the same blown film line and properties as disclosed in Example 1.

Properties of the blown films prepared for the polymers of Samples 1 and 2 and Comparative Samples 1-3 were measured according to the test parameters disclosed herein, and are provided in Table F.

TABLE F

|  | SAMPLE 1 | SAMPLE 2 | C. SAMPLE 1 | C. SAMPLE 2 | C. SAMPLE 3 |
|---|---|---|---|---|---|
| Thickness (mm) | 2.0 | 6.3 | 2.0 | 2.0 | 2.0 |
| OPTICAL PROPERTIES | | | | | |
| Average Clarity (%) | 93.68 | 94.76 | 91.3 | 92.86 | 94.46 |
| Average Gloss | 54.59 | 62.07 | 46.45 | 45.19 | 61.58 |
| Average Haze (%) | 9.85 | 8.21 | 12.94 | 14.22 | 8.32 |
| ABUSE PROPERTIES | | | | | |
| Average Dart (g) | 504 | 444 | 527 | 738 | 459 |
| Average Puncture (ft · lb/in$^3$) | 138.6 | 153.6 | 153.6 | 146.9 | 160.9 |
| Average Tear CD (g$_f$) | 1347.0 | 1584.6 | 1162.0 | 1281.5 | 1359.6 |
| Average Tear MD (g$_f$) | 365.4 | 375.4 | 352.6 | 375.6 | 300.1 |
| MECHANICAL PROPERTIES | | | | | |
| Average Secant Modulus - CD (psi) | 41,542 | 40,858 | 40,326 | 47,639 | 41,865 |
| Average Secant Modulus - MD (psi) | 34,912 | 33,731 | 32,844 | 37,427 | 34,992 |
| Average Tensile Strength - CD (psi) | 7149.5 | 6439.1 | 6013.5 | 6420.4 | 7291.5 |
| Average Tensile Strength - MD (psi) | 7121.9 | 7036.4 | 6305.9 | 6648.4 | 7422.0 |

As can be seen from the properties of the blown films of Example 3, the blown films of Sample 1 and Sample 2, which were prepared according to embodiments disclosed and described herein mixed with 20 wt. % LDPE, had abuse and mechanical properties that were comparable with Comparative Samples 1-3, which were prepared from conventional ethylene-based polymers mixed with 20 wt. % LDPE, but Sample 1 and Sample 2 had improved optical properties when compared to Comparative Samples 1-3, which shows the improved balance of optical properties, abuse properties, and mechanical properties of blown films made according to embodiments disclosed and described herein even when mixed with LDPE.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects. Additionally, all ranges recited in this disclosure include the endpoints of the ranges unless specifically state otherwise (such as by "less than" or "greater than").

The invention claimed is:

1. A blown film comprising a bimodal ethylene-based polymer comprising:
   a high density fraction (HDF) from 3.0% to 25.0%, wherein the high density fraction is measured by crystallization elution fractionation (CEF) integration at temperatures from 93° C. to 119° C.;
   an $I_{10}/I_2$ ratio from 5.5 to 7.5, wherein $I_2$ is a melt index when measured according to ASTM D 1238 at a load of 2.16 kg and temperature of 190° C. and $I_{10}$ is a melt index when measured according to ASTM D 1238 at a load of 10 kg and temperature of 190° C.;
   a short chain branching distribution (SCBD) less than or equal to 10° C., wherein the short chain branching distribution is measured by CEF full width at half height;
   a density from 0.902 g/cc to 0.925 g/cc, wherein the density is measured in accordance with ASTM D792, Method B, and a melt index ($I_2$) from 0.5 g/10 mins to 2.0 g/10 mins, wherein the melt index ($I_2$) is measured in accordance to ASTM D1238 at 190° C. at 2.16 kg.

2. The blown film of claim 1, wherein the bimodal ethylene-based polymer has a density from 0.910 g/cc to 0.920 g/cc.

3. The blown film of claim 1, wherein bimodal ethylene-based polymer has a melt index ($I_2$) from 0.7 g/10 mins to 1.8 g/10 mins.

4. The blown film of claim 1, wherein the bimodal ethylene-based polymer has a zero shear velocity ratio from 1.1 to 3.0.

5. The blown film of claim 1, wherein the blown film has average clarity from 97.0% to 99.5%, wherein the average clarity is measured using BYK Gardner Haze-gard as specified in ASTM D 1746.

6. The blown film of claim 1, wherein the blown film has average gloss from 50 to 75, wherein the average gloss is measured in accordance with ASTM D2457 using a BYK Gardner Glossmeter Microgloss at 45°.

7. The blown film of claim 1, wherein the blown film has average bulk haze from 6.25% to 13.75%, wherein the average bulk haze is measured in accordance with ASTM D1003 using BYK Gardner Haze-gard.

8. The blown film of claim 7, wherein the blown film has average dart impact strength from 450 g/mil to 700 g/mil, wherein the average dart impact strength is measured according to ASTM-D 1709-04, Method A.

9. The blown film of claim 1, wherein the blown film has average puncture from 125.0 ft·lb/in$^3$ to 175.0 ft·lb/in$^3$, wherein the average puncture is measured in accordance with ASTM D5748-95.

10. The blown film of claim 1, wherein the blown film has average tear in a cross-machine direction from 325 g/mil to 550 g/mil wherein the average tear is Elmendorf Tear Resistance measured in accordance with ASTM D1922.

11. The blown film of claim 1, wherein the blown film has average tear in a machine direction from 250 g/mil to 350 g/mil, wherein the average tear is Elmendorf Tear Resistance measured in accordance with ASTM D1922.

12. The blown film of claim 1, wherein the blown film has average secant modulus in a cross-machine direction from 10,000 psi to 39,000 psi, wherein the average secant modulus is measured in accordance with ASTM D882.

13. The blown film of claim 1, wherein the blown film has average secant modulus in a machine direction from 10,000 psi to 33,500 psi, wherein the average secant modulus is measured in accordance with ASTM D882.

14. The blown film of claim 1, wherein the blown film has average tensile strength in a cross-machine direction from 7500.0 psi to 8000.0 psi, wherein the average tensile strength is measured in accordance with ASTM D882.

15. The blown film of claim 1, wherein the blown film has average tensile strength in a cross-machine direction from 8000.0 psi to 8700.0 psi, wherein the average tensile strength is measured in accordance with ASTM D882.

16. The blown film of claim 1, wherein the blown film comprises a mixture of the bimodal ethylene-based polymer and at least one polymer selected from the group consisting of low density polyethylene, ultra-low density polyethylene, linear low density polyethylene, high density polyethylene, a propylene-based polymer, and mixtures thereof.

17. The blown film of claim 1, wherein the bimodal ethylene-based polymer has a HDF from 3.0% to 7.5%.

18. The blown film of claim 1, wherein the bimodal ethylene-based polymer has an $I_{10}/I_2$ ratio from 5.5 to 6.0.

19. The blown film of claim 1, wherein the bimodal ethylene-based polymer has an SCBD less than or equal to 8° C.

20. The blown film of claim 1, wherein the bimodal ethylene-based polymer has a ratio of Mw to Mn less than 2.800.

* * * * *